United States Patent
Paravasthu et al.

(10) Patent No.: US 11,893,522 B2
(45) Date of Patent: Feb. 6, 2024

(54) METHOD AND SYSTEM FOR PROVIDING JUST-IN-TIME (JIT) SERVICE TO AUTOMOTIVE USERS

(71) Applicant: Wipro Limited, Bangalore (IN)

(72) Inventors: Aravindan Paravasthu, Chennai (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 364 days.

(21) Appl. No.: 17/235,081

(22) Filed: Apr. 20, 2021

(65) Prior Publication Data
US 2022/0270010 A1 Aug. 25, 2022

(30) Foreign Application Priority Data
Feb. 24, 2021 (IN) .............................. 202141007857

(51) Int. Cl.
*G06Q 10/00* (2023.01)
*G06Q 10/0631* (2023.01)
*G06F 16/903* (2019.01)

(52) U.S. Cl.
CPC . *G06Q 10/06311* (2013.01); *G06F 16/90335* (2019.01)

(58) Field of Classification Search
USPC ................. 705/7.25, 7.12; 701/465
See application file for complete search history.

(56) References Cited

U.S. PATENT DOCUMENTS

| | | | |
|---|---|---|---|
| 7,412,042 B2 | 8/2008 | Henry | |
| 7,974,873 B2 | 7/2011 | Simmons et al. | |
| 8,160,614 B2 | 4/2012 | Shaffer et al. | |

(Continued)

FOREIGN PATENT DOCUMENTS

WO 20140134480 A1 9/2014

OTHER PUBLICATIONS

Jung, Pascal, and Thomas Zwerg. "Location-Based Process Monitoring." Technische Berichte des Hasso-Plattner-Instituts für Softwaresystemtechnik an der Universität Potsdam (2016): 47. (Year: 2016).*

(Continued)

*Primary Examiner* — Gurkanwaljit Singh
(74) *Attorney, Agent, or Firm* — Finnegan, Henderson, Farabow, Garrett & Dunner LLP

(57) ABSTRACT

The present disclosure is related to Just-In-Time (JIT) services, that discloses a method and system for providing JIT services to automotive users. A Point of Interest (PoI) service aggregator system may receive a service request from an automotive user, including one of: information related to a preferred PoI service provider, request to recommend PoI service providers, or request to list PoI service providers based on user query. Based on service request, the PoI service aggregator system may perform one of: dynamically on-boarding the preferred PoI service provider, recommending PoI service providers, or providing PoI service providers based on user query. Thereafter, a real-time synchronization may be established between a candidate PoI service provider and the automotive user to enable the candidate PoI service provider to determine arrival events including an estimated time of arrival and non-arrival events of the automotive user, to provide JIT service to the automotive user.

20 Claims, 27 Drawing Sheets

(56) References Cited

U.S. PATENT DOCUMENTS

| | | | |
|---|---|---|---|
| 8,510,128 B2 | 8/2013 | Schoenberg | |
| 8,838,751 B1* | 9/2014 | Scofield | H04W 4/02 |
| | | | 709/229 |
| 9,282,430 B1* | 3/2016 | Brandmaier | H04W 4/90 |
| 9,313,163 B2 | 4/2016 | Salonen | |
| 9,493,130 B2 | 11/2016 | Penilla et al. | |
| 10,104,605 B1* | 10/2018 | Parshin | G06Q 30/0261 |
| 10,402,894 B2* | 9/2019 | Childress | H04W 4/027 |
| 10,460,350 B2 | 10/2019 | Polo | |
| 10,600,105 B1* | 3/2020 | Kumar | G06Q 30/0637 |
| 11,049,059 B2* | 6/2021 | Wang | G06Q 50/30 |
| 2009/0074168 A1 | 3/2009 | Henry | |
| 2009/0323909 A1 | 12/2009 | Timmons | |
| 2012/0041675 A1* | 2/2012 | Juliver | G06Q 10/08 |
| | | | 701/465 |
| 2012/0253551 A1 | 10/2012 | Halimi et al. | |
| 2017/0046644 A1* | 2/2017 | Zhang | G06Q 30/0635 |
| 2017/0220966 A1* | 8/2017 | Wang | G06Q 20/322 |
| 2017/0293950 A1* | 10/2017 | Rathod | G06Q 30/0283 |
| 2017/0310770 A1* | 10/2017 | Samaan | H04L 67/53 |
| 2018/0018642 A1* | 1/2018 | Schmitz | G06Q 30/0255 |
| 2018/0018718 A1* | 1/2018 | Childress | G06Q 30/0281 |
| 2018/0060778 A1* | 3/2018 | Guo | G01C 21/3667 |
| 2018/0197419 A1* | 7/2018 | Li | H04W 4/025 |
| 2018/0315088 A1* | 11/2018 | Bijor | G06Q 30/0261 |
| 2018/0330621 A1* | 11/2018 | Kuncl | G08G 1/205 |
| 2019/0149952 A1* | 5/2019 | Parks, Jr. | G06Q 30/0635 |
| | | | 705/26.82 |
| 2020/0043063 A1* | 2/2020 | London | G05D 1/0088 |
| 2020/0141741 A1* | 5/2020 | Wang | G01C 21/343 |
| 2020/0219163 A1* | 7/2020 | Kumar | G06Q 30/0627 |
| 2021/0012264 A1* | 1/2021 | Grant, III | G16H 10/60 |
| 2021/0272394 A1* | 9/2021 | Cella | G06N 3/045 |

OTHER PUBLICATIONS

Huschebeck, Marcel, and Jacques Leonardi. "Approaching delivery as a service." Transportation Research Procedia 46 (2020): 61-68. (Year: 2020).*

Zeegers, Erik AW. "Lean for Logistic Service Providers." Tilburg University, Thesis, Eindhoven, Jun. 2010 (Year: 2010).*

De Stefano, Valerio. "The rise of the just-in-time workforce: On-demand work, crowdwork, and labor protection in the gig-economy." Comp. Lab. L. & Pol'y J. 37 (2015): 471. (Year: 2015).*

I.A. Kandamby, A.W.S.G. Sasiprabha, Perera K.G.I.D., Mahaadikara M. D.J.T Hansika, Arachchi T.L.P., & Ganegoda, D. (2020). Service provider allocation and customers' service requests management system. International Research Journal of Innovations in Engineering and Technology, 4(12), 28-34. (Year: 2020).*

* cited by examiner

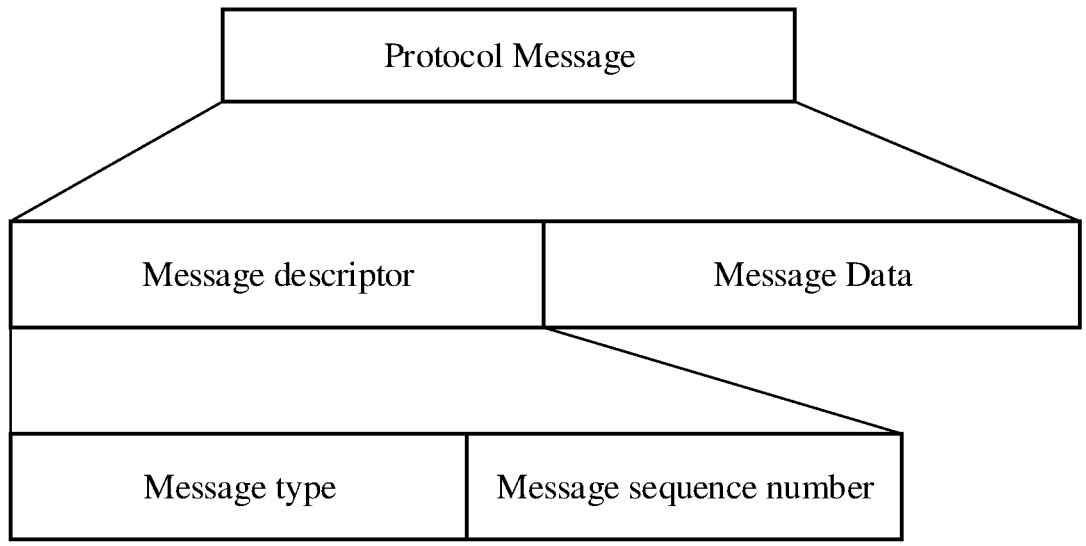
FIG.2B(1)
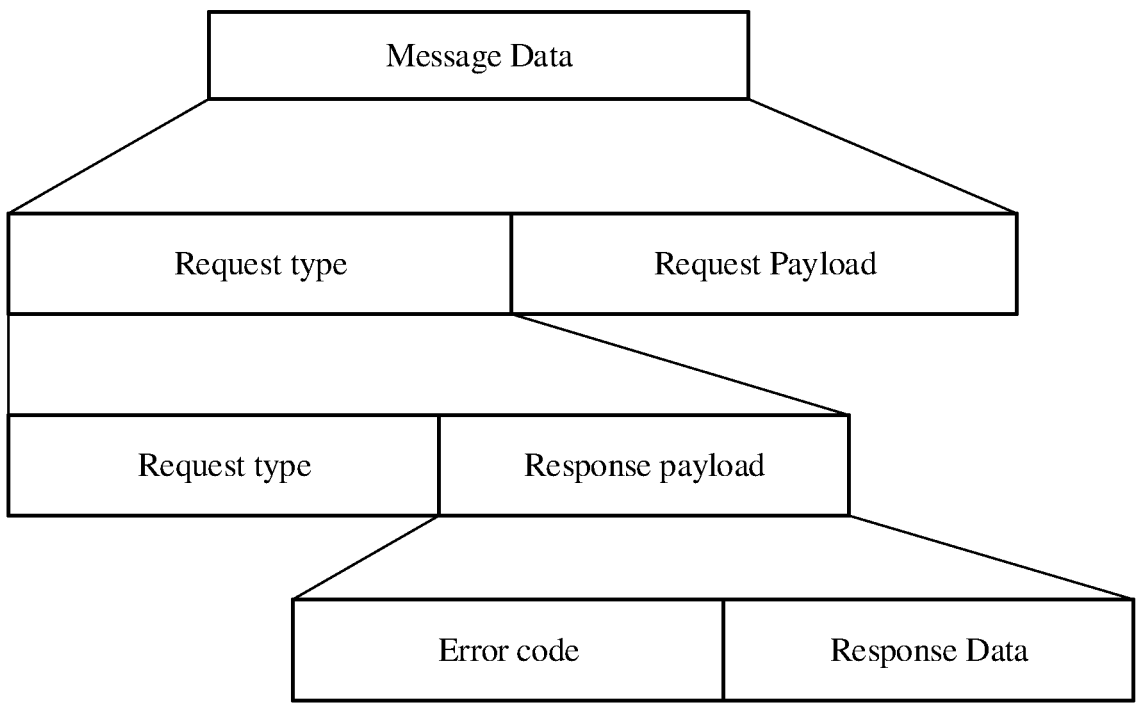
FIG.2B(2)

| Message Type | Description |
|---|---|
| REQUEST | This message is sent either to request for some information or some action and would always be followed by a RESPONSE message which provides a status or a result for the request. |
| RESPONSE | A RESPONSE message is sent in reply to a REQUEST message to provide requested information, status, and the like. |
| UPDATE | An UPDATE message is sent periodically by in-vehicle device 103 to intimate the candidate PoI Service Provider about current location and status of the vehicle 101. The update is always in relation to a currently open request. This message type is only to update information or status, but does not require the receiving entity to respond in any manner. |
| NOTIFICATION | A NOTIFICATION message is sent by the candidate PoI service provider to notify the in-vehicle device 103 about various events or changes which may impact travel of the vehicle 101 towards PoI i.e., towards location of the candidate PoI service provider. As an example, the notification may be related to traffic blockades in the vicinity of the PoI. In order to receive such messages an in-vehicle device 103 may need to first send a register request and then unregister when notifications are no longer required. |
| SUGGESTION | A SUGGESTION message is sent by the candidate PoI service provider to the in-vehicle device about a nearby PoI service provider 107 who could match the automotive user's preferences/needs based on current location and past history. In order to receive such messages an in-vehicle device 103 may need to first send a register request and then unregister when suggestions are no longer required. |

FIG.2B(3)

| Request Type | Description |
|---|---|
| NEW_TOKEN | Request PoI service aggregator system 105 for a new token to indicate beginning of a transaction |
| POI_QUERY | Query PoI service aggregator system 105 for a list of PoI service providers 107 on the basis of user provided input |
| POI_RECOMMEND | Request PoI service aggregator system 105 to provide a list of PoI service providers 107 as recommendation |
| RECORD_RELEVANCE_FEEDBACK | Record user provided feedback on relevance of results returned for PoI query |
| SERVICE_CATALOG_FETCH | Request for a catalogue of items provided by the candidate PoI Service Provider |
| NEW_REQUEST | Place a new request with the candidate PoI Service Provider for items chosen by the automotive user from a service catalogue |
| NEGOTIATE_UPDATE_INTERVAL | Agree with candidate PoI Service Provider on an update interval on the way to the PoI |
| REQUEST_CANCELLATION | Cancel a request unilaterally – either by user, or PoI or in case of emergency |
| REQUEST_FULFILMENT_CONFIRMATION | Candidate PoI Service Provider sends this request after the request is delivered seeking confirmation and feedback from the user |
| RECORD_CUSTOMER_SATISFACTION_FEEDBACK | Record user provided feedback for a delivered request |
| REGISTER_FOR_NOTIFICATION | Request candidate PoI Service Provider to send notifications to in-vehicle device 103 |
| UNREGISTER_FOR_NOTIFICATION | Request candidate PoI Service Provider to stop sending notifications to in-vehicle device 103 |
| ONBOARD_GUEST_PROVIDER | Request from automotive user to on-board a guest provider who is not part of the pre-registered JIT service providing network |
| REGISTER_FOR_SUGGESTIONS | Request from in-vehicle device 103 to PoI service aggregator system 105 to provide proactive PoI suggestions |
| UNREGISTER_FOR_SUGGESTIONS | Request from in-vehicle device 103 to PoI service aggregator system 105 to stop providing proactive PoI suggestions |

FIG.2B(4)

| Error Code | Description |
|---|---|
| NO_ERROR | The request was successfully processed by the recipient |
| INVALID_VID | The request did not contain a valid vehicle identifier |
| UNAUTHORIZED | The requested operation was disallowed |
| SYSTEM_FAILURE | There is some catastrophic failure due to which request could not be processed |
| QUERY_FAILED | Indicates that PoI query could not be resolved |
| INVALID_FEEDBACK | Feedback value did not fall within accepted range |
| CAPACITY_EXCEEDED | The new request could not be accepted because the candidate PoI Service Provider is either out of stock or overbooked |
| INTERVAL_REJECTED | The update interval sent in negotiation request is not acceptable to the candidate PoI Service Provider which has proposed a value for the same |
| INVALID_REQUEST | The request was disallowed because it was improperly formatted |
| UNEXPECTED_REQUEST | The request was disallowed because it was sent out of context e.g., cancelling a request which was never placed |

FIG.2B(5)

| ONBOARD_GUEST_PROVIDER | EMAIL ID |
|---|---|
FIG.2C(1)
| ONBOARD_GUEST_PROVIDER | ERROR CODE |
|---|---|
FIG.2C(2)
| NEW_TOKEN | VEHICLE_ID |
|---|---|
FIG.2C(3)
| NEW_TOKEN | ERROR_CODE | Token Number |
|---|---|---|
FIG.2C(4)
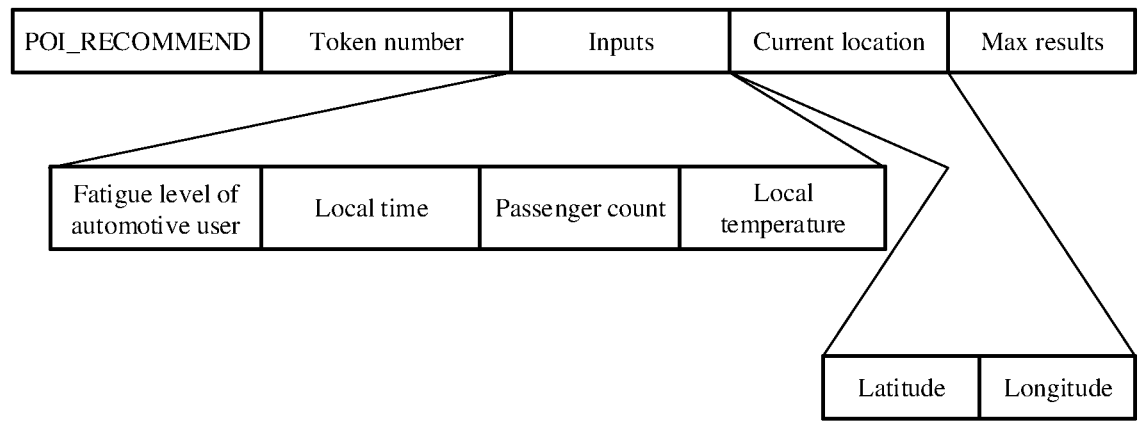
FIG.2C(5)

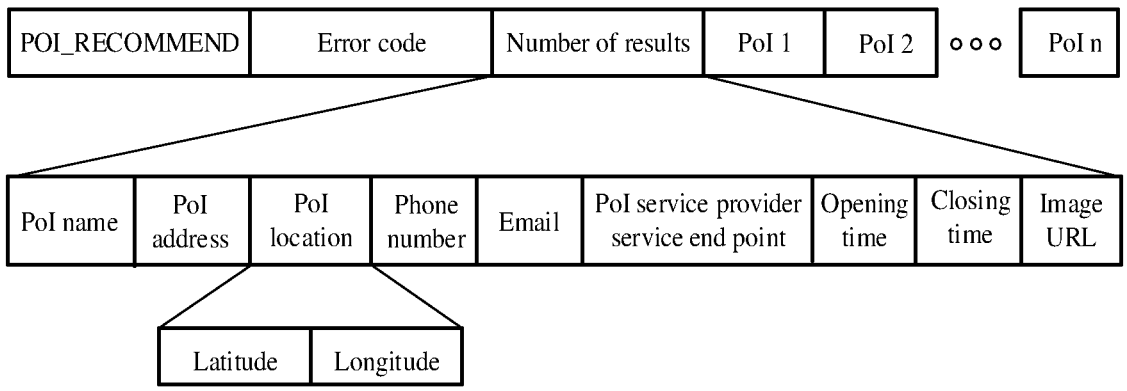
FIG.2C(6)
| RECORD_RELEVANCE_FEEDBACK | Token number | Max Rating | User Rating |
|---|---|---|---|
FIG.2C(7)
| RECORD_RELEVANCE_FEEDBACK | Error code |
|---|---|
FIG.2C(8)
| REGISTER_FOR_SUGGESTIONS | Token number |
|---|---|
FIG.2C(9)
| REGISTER_FOR_SUGGESTIONS | Error code |
|---|---|
FIG.2C(10)
| UNREGISTER_FOR_SUGGESTIONS | Token number |
|---|---|
FIG.2C(11)
| UNREGISTER_FOR_SUGGESTIONS | Error code |
|---|---|
FIG.2C(12)

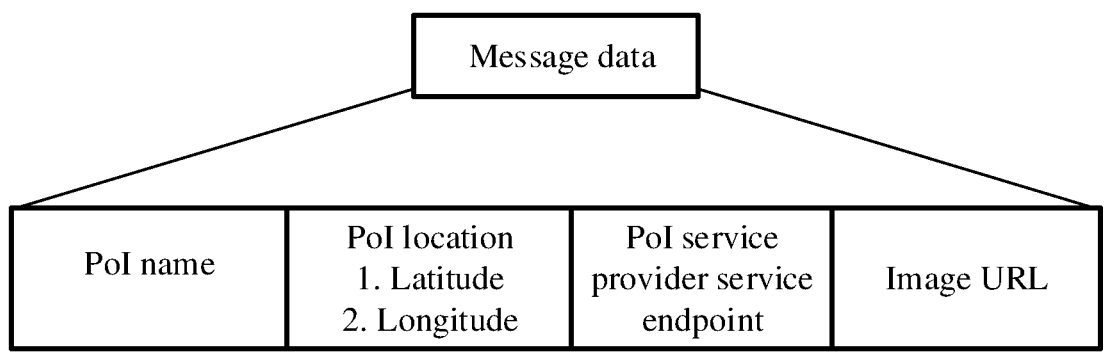
FIG.2C(13)
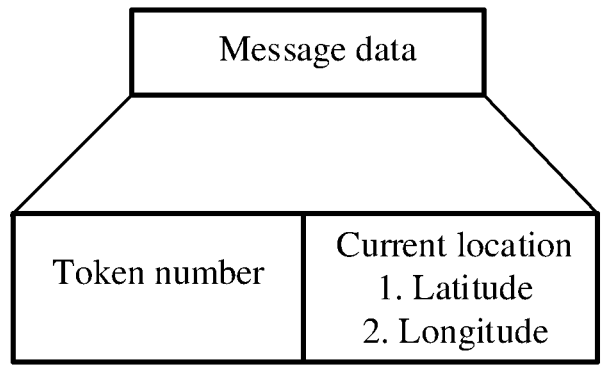
FIG.2C(14)

| POI_QUERY | Token number | Input String | Current location<br>1. Latitude<br>2. Longitude | Max results |
|---|---|---|---|---|
| | | | | |
FIG.2G(1)
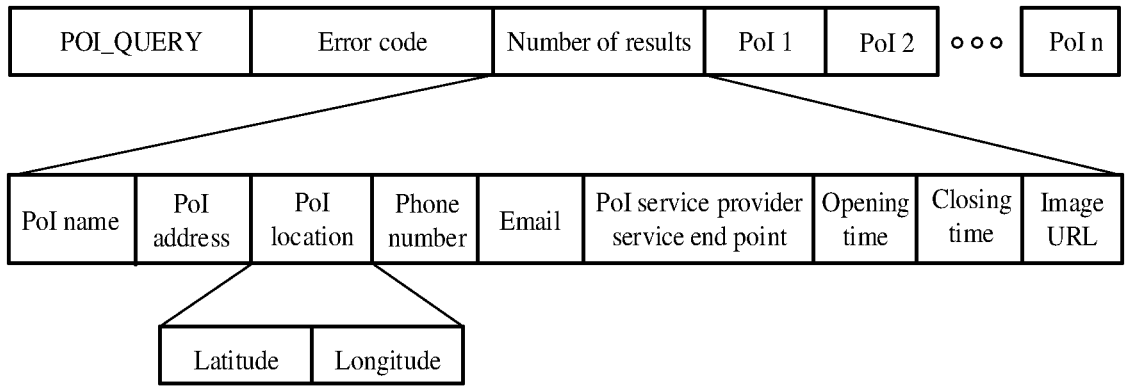
FIG.2G(2)
| NEGOTIATE_UPDATE_INTERVAL | Request number | Time unit | Interval |
|---|---|---|---|
| | | | |
FIG.2G(3)
| NEGOTIATE_UPDATE_INTERVAL | Request number | Time unit | Interval |
|---|---|---|---|
| | | | |
FIG.2G(4)

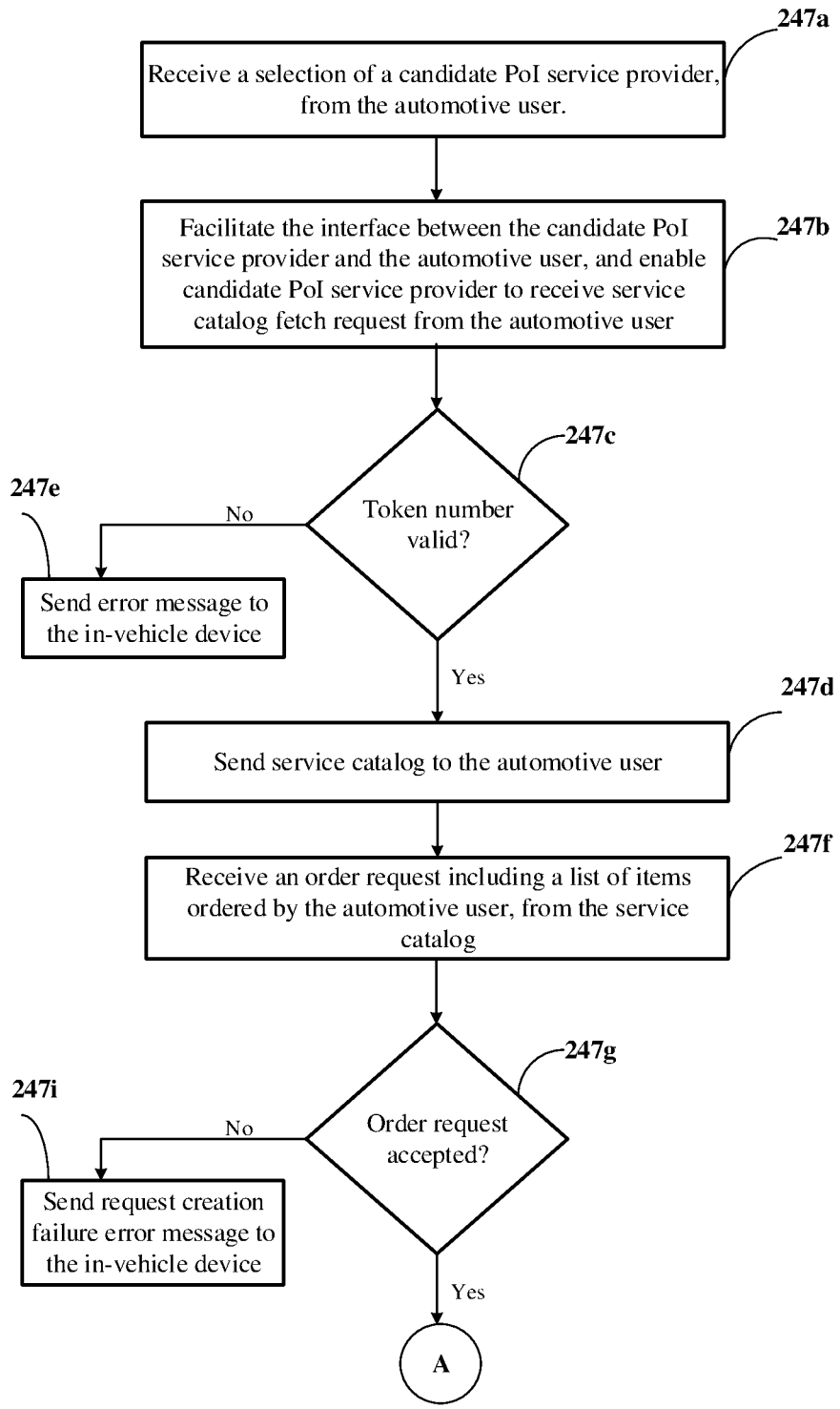
FIG.2H(1)

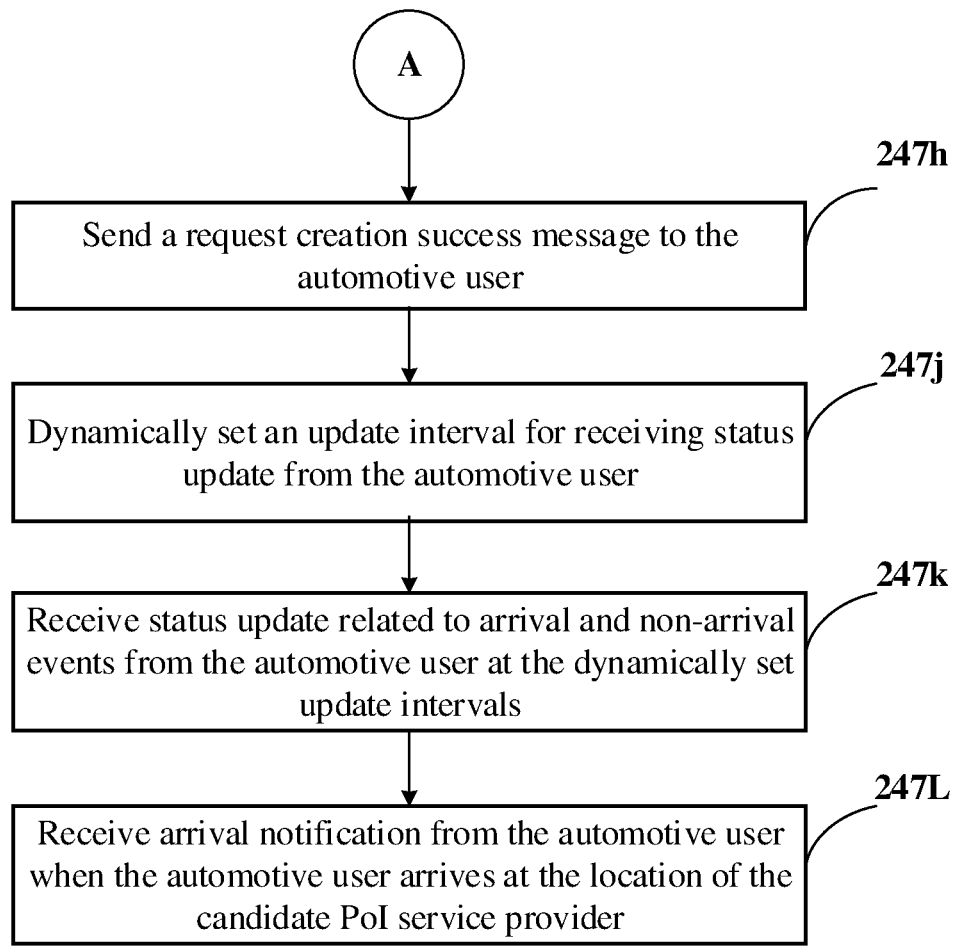
FIG.2H(1) (Continued)

| SERVICE_CATALOG_FETCH | Token number |
|---|---|
FIG.2H(2)
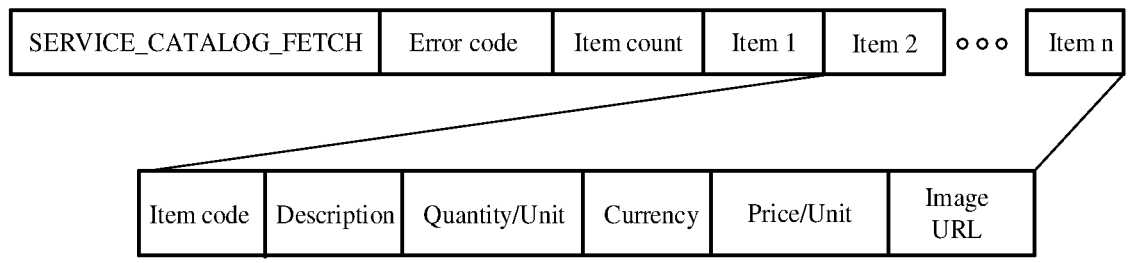
FIG.2H(3)
| NEW_REQUEST | Token number | Item count | Item 1 | Item 2 | ..... | Item n |
|---|---|---|---|---|---|---|
FIG.2H(4)
| Item code | Number of units |
|---|---|
FIG.2H(5)
| NEW_REQUEST | Error code | Request number | Currency | Bill amount |
|---|---|---|---|---|
FIG.2H(6)

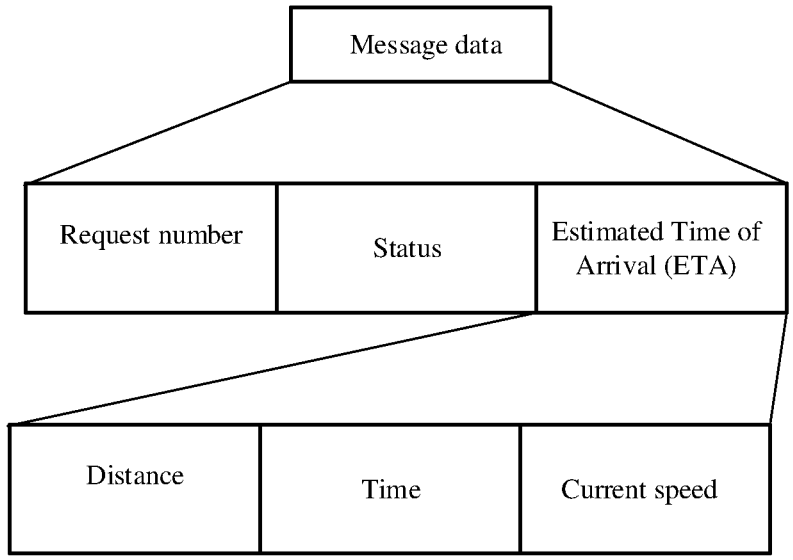

FIG.2H(7)

| Status Value | Description |
|---|---|
| STARTED | Automotive user has just started his journey towards the candidate PoI service provider |
| ON_THE_WAY | Automotive user has started his journey but is yet to reach the candidate PoI service provider |
| STUCK | Automotive user has started towards the candidate PoI service provider but his progress has been stalled due to unexpected road blocks, traffic, etc. |
| ARRIVED | Automotive user has arrived at the candidate PoI service provider |

FIG.2H(8)

| REGISTER_FOR_NOTIFICATION | Request number |
|---|---|

FIG.2H(9)

| REGISTER_FOR_NOTIFICATION | Error code |
|---|---|

FIG.2H(10)

| | |
|---|---|
| UNREGISTER_FOR_NOTIFICATION | Request number |

FIG.2H(11)

| | |
|---|---|
| UNREGISTER_FOR_NOTIFICATION | Error code |

FIG.2H(12)

| | |
|---|---|
| Request number | Notification text |

FIG.2H(13)

| | |
|---|---|
| REQUEST_FULFILMENT_CONFIRMATION | Request number |

FIG.2H(14)

| Reason | Description |
|---|---|
| NOT_REACHED_YET | Automotive user has not yet reached the location of the candidate PoI service provider |
| REQUEST_UNFULFILLED | Candidate PoI Service Provider was unable to fulfil the request when the automotive user reached the location. |
| EXTENDED_WAIT | Automotive user left the location of the candidate PoI service provider before request fulfilment could be made due to long waiting time |

FIG.2H(15)

| | | | |
|---|---|---|---|
| RECORD_CUSTOMER_SATISFACTION_FEEDBACK | Token number | Max Rating | User Rating |

FIG.2H(16)

| RECORD_CUSTOMER_SATISFACTION_FEEDBACK | Error code |
|---|---|

FIG.2H(17)

| REQUEST_CANCELLATION | Request number | Reason | Currency | Refund amount |
|---|---|---|---|---|

FIG.2H(18)

| Reason | Description |
|---|---|
| EMERGENCY | Vehicle 101 met with an accident or the candidate PoI service provider is unreachable due to the occurrence of the incident on premises or nearby |
| OVERBOOKED | Candidate PoI Service Provider is seeing more than expected crowd and unable to meet the demand |
| USER_INITIATED | Automotive user cancelled the request due to change in plan |

FIG.2H(19)

| REQUEST_CANCELLATION | Request number: VO3453 | Reason: EMERGENCY | Currency: -NA- | Refund amount: -NA- |
|---|---|---|---|---|

FIG.2H(20)

| REQUEST_CANCELLATION | Error code | Currency | Refund amount |
|---|---|---|---|

FIG.2H(21)

| REQUEST_CANCELLATION | Error code: "NO_ERROR" | Currency: -NA- | Refund amount: -NA- |
|---|---|---|---|

FIG.2H(22)

| REQUEST_CANCELLATION | Request number: VO3453 | Reason: USER_INITIATED | Currency: -NA- | Refund amount: -NA- |
|---|---|---|---|---|

FIG.2H(23)

| REQUEST_CANCELLATION | Request number: VO3453 | Reason: OVERBOOKED | Currency: Rupees | Refund amount: 1000 |
|---|---|---|---|---|

FIG.2H(24)

| ONBOARD_GUEST_PROVIDER | EMAIL ID |
|---|---|
| | *ABCservices@kmail.com* |

FIG.2I(1)

| ONBOARD_GUEST_PROVIDER | ERROR CODE |
|---|---|
| | *NO_ERROR* |

FIG.2I(2)

| NEW_TOKEN | VEHICLE_ID |
|---|---|
| | *KA78M543* |

FIG.2I(3)

| NEW_TOKEN | ERROR_CODE | Token Number |
|---|---|---|
| | *NO_ERROR* | *V0543* |

FIG.2I(4)

| POI_RECOMMEND | Token number | Inputs: | Current location | Max results |
|---|---|---|---|---|
| | *V0543* | Fatigue level: *High* <br> Local time: *3:30 PM* <br> Passenger count: *2* <br> Local temperature: *30 degree Celsius.* | Latitude: *X* <br> Longitude: *Y* | *10* |

FIG.2I(5)

| POI_RECOMMEND | Error code: <br> *"NO_ERROR"* | Number of results: <br> *3* | PoI 1 | PoI 2 | PoI 3 |
|---|---|---|---|---|---|
| | | | | | |

FIG.2I(6)

| PoI 1 | PoI 2 | PoI 3 |
|---|---|---|
| PoI name: *AB Ice creams* <br> PoI address: *#20, PQR street, Bangalore, India* <br> PoI location: <br> *Lat – X; Long – Y* <br><br> Phone number: *123456789* <br> Email: *ABicecreams@mail.com* <br> Endpoint: <br> *https://ABicecreams.com/apis/* <br> Opening time: *10:00 AM* <br> Closing time: *9:00 PM* <br> Image URL: <br> *"https://ABiccreams.com/images/photo1.png"* | PoI name: *DC Ice creams* <br> PoI address: *#248, JKL street, Bangalore, India* <br> PoI location: <br> *Lat – X'; Long – Y'* <br><br> Phone number: *546789543* <br> Email: *DCicecreams@mail.com* <br> Endpoint: <br> *https://DCicecreams.com/apis/* <br> Opening time: *10:00 AM* <br> Closing time: *7:00 PM* <br> Image URL: *"https://DCicecreams.com/images/photo1.png"* | PoI name: *YK Cafe* <br> PoI address: *#458, MCG street, Bangalore, India* <br> PoI location: *Lat – X"; Long – Y"* <br> Phone number: *234534563* <br> Email: *YKcafe@mail.com* <br> Endpoint: <br> *https://YKicecreams.com/apis/* <br> Opening time: *10:00 AM* <br> Closing time: *11:00 PM* <br> Image URL: *"https://YKicecreams.com/images/photo1.png"* |

FIG.2I(7)

| RECORD_RELEVANCE_FEEDBACK | Token number: *V0543* | Max Rating: *10* | User Rating: *8* |
|---|---|---|---|

FIG.2I(8)

| POI_QUERY | Token number: *V0543* | Input String: *#%@&\*\*\** | Current location Latitude: *X* Longitude: *Y* | Max results *10* |
|---|---|---|---|---|

FIG.2I(9)

| POI_QUERY | Error code *QUERY_FAILED* | No. of results -- | PoI 1 -- | PoI 2 -- | ...... | PoI n -- |
|---|---|---|---|---|---|---|

FIG.2I(10)

| POI_QUERY | Token number: *V0543* | Input String: *Want to have lunch* | Current location Latitude: *X* Longitude: *Y* | Max results *10* |
|---|---|---|---|---|

FIG.2I(11)

| POI_RECOMMEND | Error code: *"NO_ERROR"* | Number of results: *3* | PoI 1.1 | PoI 2.1 | PoI 3.1 |
|---|---|---|---|---|---|

FIG.2I(12)

| PoI 1.1 | PoI 2.1 | PoI 3.1 |
|---|---|---|
| PoI name: *Restaurant AG*<br>PoI address: *#47, BDS street, Bangalore, India*<br>PoI location:<br>*Lat – X; Long – Y*<br><br>Phone number: *123456789*<br>Email: *AGRestaurant@mail.com*<br>Endpoint: *https://agrestaurant.com/apis/*<br>Opening time: *10:00 AM*<br>Closing time: *9:00 PM*<br>Image URL: *"https://agrestaurant.com/images/photo1.png"* | PoI name: *Restaurant SD*<br>PoI address: *#347, KMN street, Bangalore, India*<br>PoI location:<br>*Lat – X'; Long – Y'*<br><br>Phone number: *546789543*<br>Email: *Restaurant_SD@mail.com*<br>Endpoint: *https://SDrestaurant.com/apis/*<br>Opening time: *10:00 AM*<br>Closing time: *7:00 PM*<br>Image URL: *"https://SDrestaurant.com/images/photo1.png"* | PoI name: *Restaurant GH*<br>PoI address: *#677, NNB street, Bangalore, India*<br>PoI location: *Lat – X''; Long – Y''*<br>Phone number: *234534563*<br>Email: *GH_restaurants@mail.com*<br>Endpoint: *https://GHrestaurant.com/apis/*<br>Opening time: *10:00 AM*<br>Closing time: *11:00 PM*<br>Image URL: *"https://GHrestaurant.com/images/photo1.png"* |

FIG.2I(13)

| RECORD_RELEVANCE_FEEDBACK | Token number: *V0543* | Max Rating: *10* | User Rating: *9* |
|---|---|---|---|

FIG.2I(14)

| SERVICE_CATALOG_FETCH | Token number: *V0543* |
|---|---|

FIG.2I(15)

| SERVICE_CATALOG_FETCH | Error code: *"NO_ERROR"* | Item count: *5* | Item 1 | Item 2 | Item 3 |
|---|---|---|---|---|---|

FIG.2I(16)

| Item code | Description | Quantity/Unit | Currency | Price/Unit | Image URL |
|---|---|---|---|---|---|
| C1 | Masala Dosa | 1 | Rupees | 100 | "URL" |
| C2 | Noodles | 1 | Rupees | 125 | "URL" |
| C3 | Veg Biryani | 1 | Rupees | 150 | "URL" |
| C4 | Chicken Biryani | 1 | Rupees | 300 | "URL" |
| C5 | Fried rice | 1 | Rupees | 200 | "URL" |

FIG.2I(17)

| NEW_REQUEST | Token number | Item count | Item 1 | Item 2 |
|---|---|---|---|---|
| | *V0543* | *2* | Item code: *C1* <br> Number of units: *2* | Item code: *C3* <br> Number of units: *1* |

FIG.2I(18)

| NEW_REQUEST | Error code | Request number | Currency | Bill amount |
|---|---|---|---|---|
| | *NO_ERROR* | *RQ154* | *Rupees* | *350* |

FIG.2I(19)

| NEW_REQUEST | Error code | Request number | Time unit | Interval |
|---|---|---|---|---|
| | *NO_ERROR* | *RQ154* | *Minutes* | *10* |

FIG.2I(20)

| NEGOTIATE_UPDATE_INTERVAL | Error code | Time unit | Interval |
|---|---|---|---|
| | *INTERVAL_REJECTED* | *Minutes* | *5* |

FIG.2I(21)

Interval 1:

| Request number | Status | Estimated Time of Arrival (ETA) |
|---|---|---|
| *RQ154* | *STARTED* | *15 min* |

FIG.2I(22)

Interval 2:

| Request number | Status | Estimated Time of Arrival (ETA) |
|---|---|---|
| *RQ154* | *ON_THE_WAY* | *10 min* |

FIG.2I(23)

Interval 3:

| Request number | Status | Estimated Time of Arrival (ETA) |
|---|---|---|
| *RQ154* | *ON_THE_WAY* | *5 min* |

FIG.2I(24)

Interval 4:

| Request number | Status | Estimated Time of Arrival (ETA) |
|---|---|---|
| *RQ154* | *ARRIVED* | *0 min* |

FIG.2I(25)

| REQUEST_FULFILMENT_CONFIRMATION | Request number |
|---|---|
| | *RQ154* |

FIG.2I(26)

| REQUEST_FULFILMENT_CONFIRMATION | Request number | Error code |
|---|---|---|
| | *RQ154* | *NO_ERROR* |

FIG.2I(27)

| RECORD_CUSTOMER_SATISFACTION _FEEDBACK | Token number | Max Rating | User Rating |
|---|---|---|---|
| | *V0543* | *10* | *8* |

FIG.2I(28)

| RECORD_CUSTOMER_SATISFACTION_FEEDBACK | Error code |
|---|---|
| | *NO_ERROR* |

FIG.2I(29)

METHOD AND SYSTEM FOR PROVIDING JUST-IN-TIME (JIT) SERVICE TO AUTOMOTIVE USERS

TECHNICAL FIELD

The present subject matter is related in general to Just-In-Time (JIT) services, and more particularly, but not exclusively to a method and system for providing JIT services to automotive users.

BACKGROUND

The advent of autonomous cars has rapidly changed paradigm of service fulfilment to automobile users. Generally, while commuting in automobiles such as cars, automotive users leverage service fulfilment as a connected home application. As an example, the services in connection with home application could be "delivering pizza at home" using voice enabled devices such as Alexa®. In few other delivery services, the automotive user may only have to directly connect to the service providers to avail the services, through mobile phone of the user, which may compromise safety of the automotive user. Further, in such delivery services, user experience is hindered at the point of fulfilment of delivery of services requested by the automotive user. For instance, the automotive user upon reaching the Point of Interest (PoI) i.e., location of the service provider, the automotive user may have to wait for the services to be delivered. For example, consider the automotive user has ordered food from a service provider (restaurant) while commuting. In the existing techniques, this example may lead to three different scenarios. In one scenario, food ordered by the automotive user might not be ready when the automotive user arrives at the restaurant, thereby wasting time of the automotive user in waiting for food that was ordered while the automotive user was driving to the restaurant. Therefore, the main purpose of saving time by ordering food while driving is not served. In another scenario, the restaurant may be out of resources, or may be overbooked due to which restaurant may not be able to provide the services to the automotive user. However, the automotive user would learn the situation after reaching the restaurant, which leaves the automotive user with the option of selecting a different service provider at that point of time, which in turn wastes enormous amount of time for the automotive user and resulting in greater inconvenience. In yet another scenario, the food order of the automotive user may be served too hot or too cold when the automotive user reaches the restaurant, as the restaurant may not be aware of the user's expected time of arrival. Currently, the existing techniques provide services without any real-time updates of the automotive user after the automotive user places the order, thereby leading to poor customer experience as explained as different scenarios above. Along with poor customer experience, even the service providers face issues such as wastage of food when the automotive user cancels the order/bulk orders, due to lack of knowledge of real-time status of the automotive user.

Therefore, the existing techniques may enable the user to select the service provider, get navigation guidance to the service provider, and to make payment to the service provider. However, there is no mechanism in the existing techniques to accurately synchronize the service provider about expected arrival time of the automotive user who has placed the order. Further, in the existing techniques, the automotive user may have to choose a service provider only from limited number of service providers who are already registered with the service providing network. Therefore, the automotive user cannot take services from any other service provider of his interest.

Therefore, there is a need to address the aforementioned issues to ensure accurate Just-In-Time (JIT) service to the automotive users.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of providing Just-In-Time (JIT) service to automotive users. The method includes receiving, by a Point of Interest (PoI) service aggregator system, a service request from an automotive user. The service request comprises one of: information related to a preferred PoI service provider, a request to recommend one or more PoI service providers, or a request to list one or more PoI service providers based on a user query. Further, the method includes performing one of: dynamically on-boarding the preferred PoI service provider who is not a part of pre-registered JIT service providing network, dynamically providing a first list of one or more recommended PoI service providers to the automotive user, or dynamically providing a second list of one or more PoI service providers based on the user query, to the automotive user. Thereafter, the method includes establishing a real-time synchronization between a candidate PoI service provider and the automotive user. The candidate PoI service provider is one of the preferred PoI service provider on-boarded to the JIT service providing network or the PoI service provider selected by the automotive user from the first list or the second list. Finally, the method includes enabling, upon establishing the real-time synchronization, the candidate PoI service provider to dynamically determine arrival events including an estimated time of arrival and non-arrival events of the automotive user, to provide JIT service to the automotive user.

Further, the present disclosure includes Point of Interest (PoI) service aggregator system for providing Just-In-Time (JIT) service to automotive users. The PoI service aggregator system includes a processor and a memory communicatively coupled to the processor. The memory stores the processor-executable instructions, which, on execution, causes the processor to receive a service request from an automotive user. The service request comprises one of: information related to a preferred PoI service provider, a request to recommend one or more PoI service providers, or a request to list one or more PoI service providers based on a user query. Further, the processor is configured to perform one of: dynamically on-boarding the preferred PoI service provider who is not a part of pre-registered JIT service providing network, dynamically providing a first list of one or more recommended PoI service providers to the automotive user, or dynamically providing a second list of one or more PoI service providers based on the user query, to the automotive user. Thereafter, the processor is configured to establish a real-time synchronization between a candidate PoI service provider and the automotive user. The candidate PoI service provider is one of the preferred PoI service provider on-boarded to the JIT service providing network or the PoI service provider selected by the automotive user from the first list or the second list. Finally, the processor is configured to enable, upon establishing the real-time synchronization, the candidate PoI service provider to dynamically determine arrival events including an estimated time of arrival and non-arrival events of the automotive user, to provide JIT service to the automotive user.

Furthermore, the present disclosure comprises a non-transitory computer readable medium including instructions stored thereon that when processed by at least one processor causes a Point of Interest (PoI) service aggregator system to perform operations comprising, receiving a service request from an automotive user. The service request comprises one of: information related to a preferred PoI service provider, a request to recommend one or more PoI service providers, or a request to list one or more PoI service providers based on a user query. Further, the instructions cause the processor to perform one of dynamically on-boarding the preferred PoI service provider who is not a part of pre-registered JIT service providing network, dynamically providing a first list of one or more recommended PoI service providers to the automotive user, or dynamically providing a second list of one or more PoI service providers based on the user query, to the automotive user. Furthermore, the instructions cause the processor to establish a real-time synchronization between a candidate PoI service provider and the automotive user, wherein the candidate PoI service provider is one of the preferred PoI service provider on-boarded to the JIT service providing network or the PoI service provider selected by the automotive user from the first list or the second list. Finally, the instructions cause the processor to enable upon establishing the real-time synchronization, by the PoI service aggregator system, the candidate PoI service provider to dynamically determine arrival events including an estimated time of arrival and non-arrival events of the automotive user, to provide JIT service to the automotive user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2B(1) shows a high-level message structure of the Simple and Reliable Service Delivery Protocol for Automotive (SRSDPA) protocol in accordance with some embodiments of the present disclosure;

FIG. 2B(2) shows a structure of message data for "Request/"Response" message types in accordance with some embodiments of the present disclosure;

FIG. 2B(3) shows a table indicating description (purpose) of each of the aforementioned message types in accordance with some embodiments of the present disclosure;

FIG. 2B(4) shows a table indicating exemplary request types and their corresponding description in accordance with some embodiments of the present disclosure;

FIG. 2B(5) shows a table indicating exemplary error codes and their corresponding description in accordance with some embodiments of the present disclosure;

FIG. 2C(1)-FIG. 2C(14) show message structures of different message types in accordance with some embodiments of the present disclosure;

FIG. 2G(1)-FIG. 2G(4) show yet other message structures of different message types in accordance with some embodiments of the present disclosure;

FIG. 2H(1) shows a flowchart illustrating a method of establishing the real-time synchronization between the candidate PoI service provider and the automotive user in accordance with some embodiments of the present disclosure;

FIG. 2H(2)-FIG. 2H(7), FIG. 2H(9)-FIG. 2H(14), FIG. 2H(16)-FIG. 2H(18), FIG. 2H(20)-FIG. 2H(24) show yet other message structures of different message types in accordance with some embodiments of the present disclosure;

FIG. 2H(8) shows a table indicating status indications in accordance with some embodiments of the present disclosure;

FIG. 2H(15) shows a table indicating reasons for failure to provide JIT service to the automotive user in accordance with some embodiments of the present disclosure;

FIG. 2H(19) shows a table indicating reasons for dynamic cancellation of an order in accordance with some embodiments of the present disclosure;

FIG. 2I(1)-FIG. 2I(29) show various message structures of exemplary message types with exemplary values, to illustrate an exemplary scenario in accordance with some embodiments of the present disclosure;

DETAILED DESCRIPTION

Figure 1:
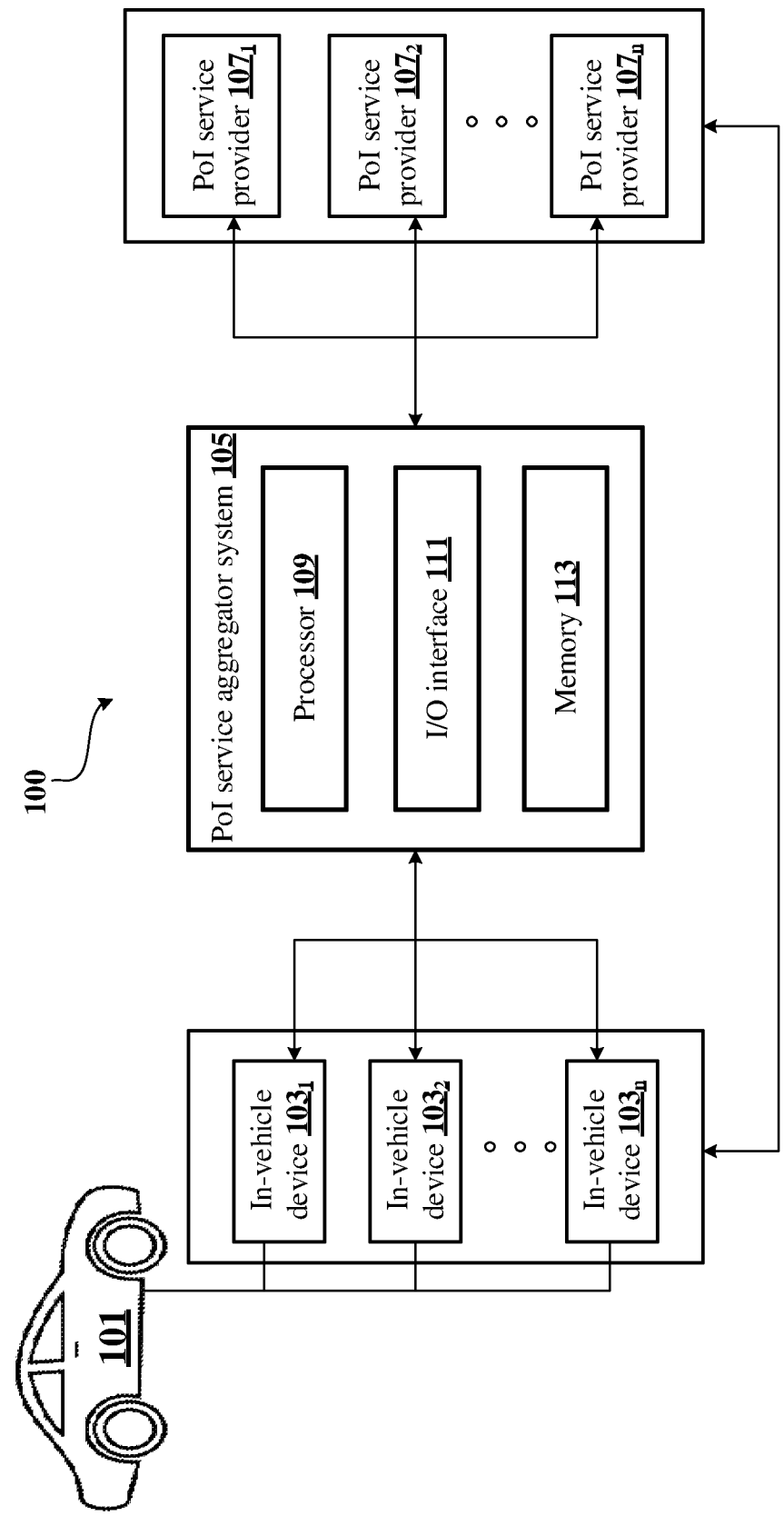
FIG. 1 shows an exemplary architecture for providing Just-In-Time (JIT) service to automotive users in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for providing Just-In-Time (JIT) service to automotive users. A Point of Interest (PoI) service aggregator system may receive a service request from an automotive user. The service request may include one of information related to a preferred PoI service provider, a request to recommend one or more PoI service providers, or a request to list one or more PoI service providers based on a user query. Based on the service request received from the automotive user, the PoI service aggregator system may perform one of: dynamically on-boarding the preferred PoI service provider that is not a part of pre-registered JIT service providing network, dynamically providing a first list of one or more recommended PoI service providers to the automotive user, or dynamically providing a second list of one or more PoI service providers based on the user query, to the automotive user. Thereafter, one of the PoI service providers may be considered as a candidate PoI service provider. The candidate PoI service provider may be one of the preferred PoI service provider on-boarded to the JIT service providing network or the PoI service provider selected by the automotive user from the first list or the second list. Further, the PoI service aggregator system may establish a real-time synchronization between the candidate PoI service provider and the automotive user. The real-time synchronization thus established, may allow the candidate PoI service provider and the automotive user to communicate. The candidate PoI service provider may send a service catalog to the automotive user, and the automotive user may select a list of items from the service catalog and order the list of items with the candidate PoI service provider. The candidate PoI service provider may create the order request and thereafter, dynamically determine arrival events including an estimated time of arrival and non-arrival events of the automotive user, to provide JIT service to the automotive user, with respect to the order request.

The present disclosure allows monitoring the arrival and non-arrival events in real-time, which in turn enables the following:

Providing JIT services to the automotive user on time, without any delay, since the service provider would receive the real-time status update of the location of the vehicle at regular intervals. For example, consider the automotive user is 10 kms away from the location of the service provider when the order request was placed. If the service provider begins to prepare the food items that the automotive user ordered, at that instance itself, the food items may become cold by the time the automotive user arrives at the location of the service provider. Or if the service provider assumes a particular time of arrival of the automotive user, and accordingly begin to prepare the food items ordered by the automotive user, the food preparation may be still on-going when the automotive user arrives at the location of the service provider, thereby causing delay in providing services to the user. In the present disclosure, since the service provider receives a real-time status update of the automotive user commuting in vehicle at regular intervals, the service provider can plan the timing properly to provide JIT services. In this example, the service provider may begin to prepare the food items when the automotive user is at a distance of 3 kms to the location of the service provider, to ensure that, the order is ready for the automotive user, when the automotive user arrives, without any delay. Therefore, the present disclosure helps in enhancing the user experience substantially.

Managing cancellations by computing the penalty to be imposed based on the proximity factor of the automotive user to the location of the service provider, when the cancellation request was initiated. Proximity of the automotive user to the location of the service provider is known, only because of the real-time status updates related to arrival and non-arrival provided by the in-vehicle device of the vehicle of the automotive user. Determining penalty to be charged based on proximity may ensure that each automotive user is charged as per their actions, instead of static penalty charges. As an example, if the automotive user was proximal, for example, at 1 km distance from the location of the service provider, when the cancellation request was initiated, it can be inferred that, the automotive user made a late decision. In such cases, the service provider might have already begun to prepare the order. Therefore, to compensate such situations, penalty can be calculated based on the proximity factor. As an example, if the automotive user is completely in a different route instead of the route that leads to the service provider, it can be inferred that, the automotive user never intended to arrive at the location of the service provider. In such cases, it can be treated as an intentional cancellation and the automotive user can be charged maximum penalty. As an example, if the cancellation request was initiated because of an emergency situation such as accident or health issues, then penalty can be completely waived for such cancellation requests irrespective of the proximity factor. Therefore, the present disclosure enables accurate charging for cancellations, which eliminates the hassles of static cancellation charges, over charging or under charging.

The present disclosure has a PoI service aggregator system acts as a hub that connects the service providers and also the automotive users. The automotive users communicate with the PoI service aggregator system to get information such as dynamic recommendations of the service providers, to on-board the preferred PoI service provider and the like. Only when the service provider is finalized by the automotive user, the automotive user would be directly connected to communicate with the service provider. This ensures that a real-time synchronization is established between the service providers and the automotive users, to exchange the status updates, and also enhances privacy. Real-time synchronization between service provider and automotive user based on expected arrival time helps in improving quality-of-service for the automotive user.

The present disclosure provides a feature wherein inadvertent events such as emergencies are automatically detected in real-time by the in-vehicle device and the automotive user is aided with responsive action based on such detection, which provides improved user experience.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for providing Just-In-Time (JIT) service to automotive users in accordance with some embodiments of the present disclosure;

The architecture 100 includes a vehicle 101, in-vehicle device $103_1$ to in-vehicle device $103_n$ (also referred to as in-vehicle devices 103), an automotive user (not shown in the FIG. 1), a Point of Interest (PoI) service aggregator system 105 and a PoI service provider $107_1$ to PoI service provider $107_n$ (also referred to as one or more PoI service providers 107). In some embodiments, the automotive user may be any user commuting in the vehicle 101. The automotive user may communicate with the PoI service aggregator system 105 and the one or more PoI service providers 107 via one of the in-vehicle devices 103. As an example, the in-vehicle devices 103 may include, but not limited to, a driver infotainment system, a heads-up display, a rear-seat entertainment system and the like. In some embodiments, the in-vehicle devices 103, the PoI service aggregator system 105 and the one or more PoI service providers 107, may communicate with each other via communication network (not shown in the FIG. 1). In some embodiments, the communication network may be a wireless communication network. In some embodiments, the PoI service aggregator system 105 may act as a bridge between the one or more PoI service providers 107 and the in-vehicle devices 103. As an example, one of the in-vehicle devices 103 may communicate with the PoI service aggregator system 105 to perform activities such as receiving a list of one or more PoI service providers 107, providing a selection of a PoI service provider 107, and the like. Thereafter, the in-vehicle devices 103 may communicate with the selected PoI service provider 107 directly to receive the Just-In-Time (JIT) services.

The PoI service aggregator system 105 includes a processor 109, an Input/Output (I/O) interface 111 and a memory 113. The I/O interface 111 may receive a service request from the automotive user. In some embodiments, the automotive user may be any user commuting in the vehicle 101. The service request may include one of, information related to a preferred PoI service provider, a request to recommend one or more PoI service providers 107, or a request to list one or more PoI service providers 107 based on a user query. In some embodiments, the preferred PoI service provider may be a service provider who is not a part of pre-registered JIT service providing network. Thereafter, the processor 109 may perform one of the activities based on the service request. For instance, when the service request includes information related to a preferred PoI service provider, the processor 109 may dynamically on-board the preferred PoI service provider who is not a part of the pre-registered JIT service providing network. Similarly, when the service request includes the request to recommend one or more PoI service providers 107, the processor 109 may dynamically provide a first list of one or more recommended PoI service providers 107 to the automotive user. Further, when the service request includes the request to list one or more PoI service providers 107 based on the user query, the processor 109 may dynamically provide a second list of one or more PoI service providers 107 based on the user query, to the automotive user.

Further, the automotive user may select one of the one or more PoI service providers 107 from the first list or the second list. In some embodiments, when the service request of the automotive user includes the request to recommend one or more PoI service providers 107, then the automotive user may select one of the one or more PoI service providers 107 from the first list. In some embodiments, when the service request of the automotive user includes the request to list one or more PoI service providers 107 based on the user query, then the automotive user may select one of the one or more PoI service providers 107 from the second list. In some other embodiments, if the service request includes information related to the preferred PoI service provider, then the automotive user has already made the selection, since the automotive user opted to get services of the preferred PoI service provider via the service request. In some embodiments, such PoI service provider selected by the automotive user either from the first list or second list, or by stating the preferred PoI service provider in the service request, may be referred as a candidate PoI service provider.

In some embodiments, the processor 109 may establish a real-time synchronization between the candidate PoI service provider and the automotive user. The real-time synchronization thus established may enable the candidate PoI service provider to dynamically determine arrival events including an estimated time of arrival and non-arrival events of the automotive user, to provide the JIT service to the automotive user. In some embodiments, the JIT service may include, but not limited to, dynamically managing reservations at the candidate PoI service provider, dynamically managing preparation of order placed by the automotive user, and dynamically managing cancellations of order placed by the automotive user, by monitoring the arrival and the non-arrival events of the automotive user.

Further, the processor 109 may receive a feedback from the automotive user. In some embodiments, the feedback may be related to relevancy of the one or more recommended PoI service providers 107 in the first list, relevancy of the one or more PoI service providers 107 in the second list, and service provided by the candidate PoI service provider.

Figure 2A:
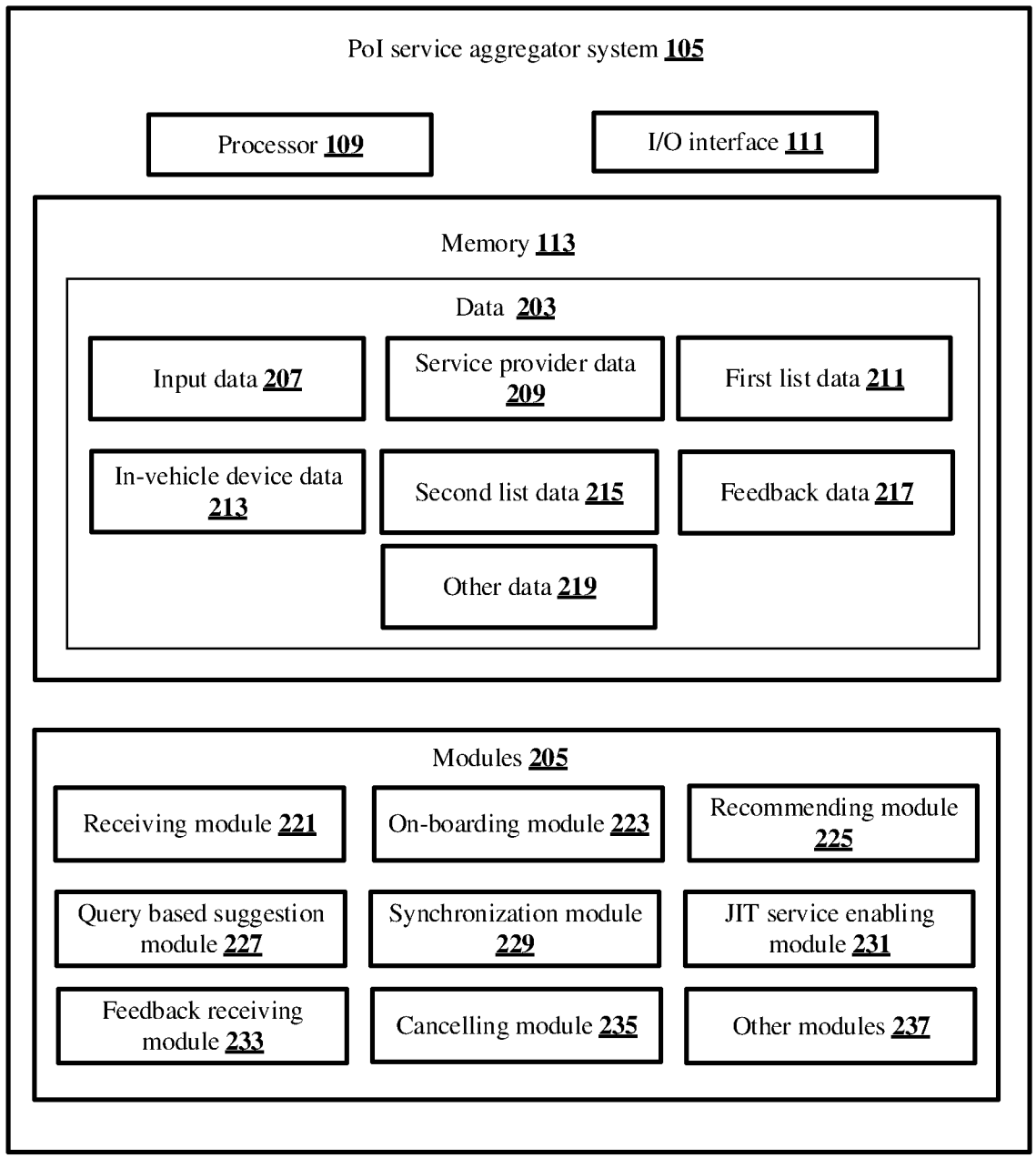
FIG. 2A shows a detailed block diagram of a Point of Interest (PoI) service aggregator system for providing Just-In-Time (JIT) service to automotive users in accordance with some embodiments of the present disclosure.
Figure 2D:
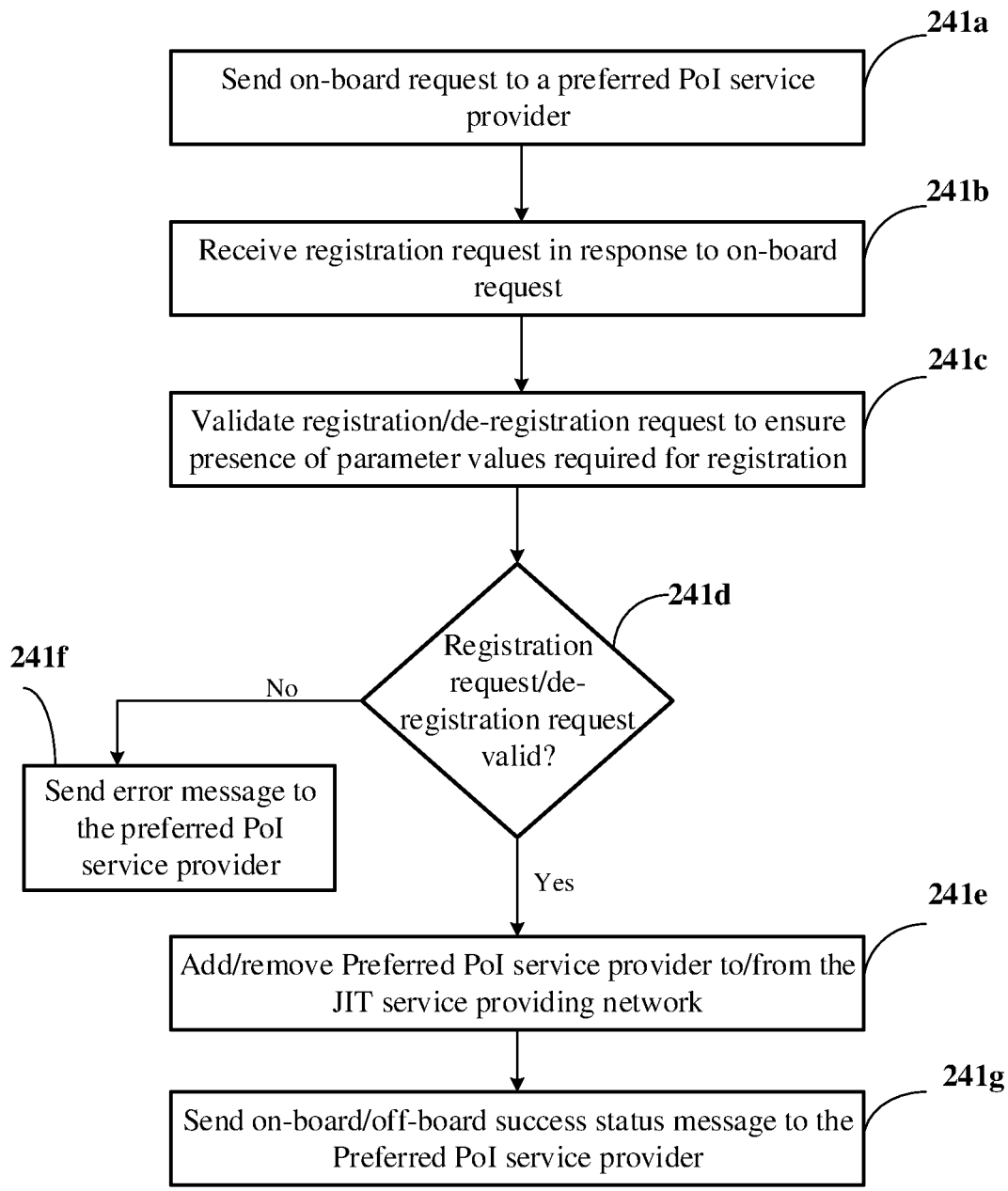
FIG. 2D shows a flowchart illustrating a method of on-boarding a preferred PoI service provider to the JIT service network in accordance with some embodiments of the present disclosure.
Figure 2E:
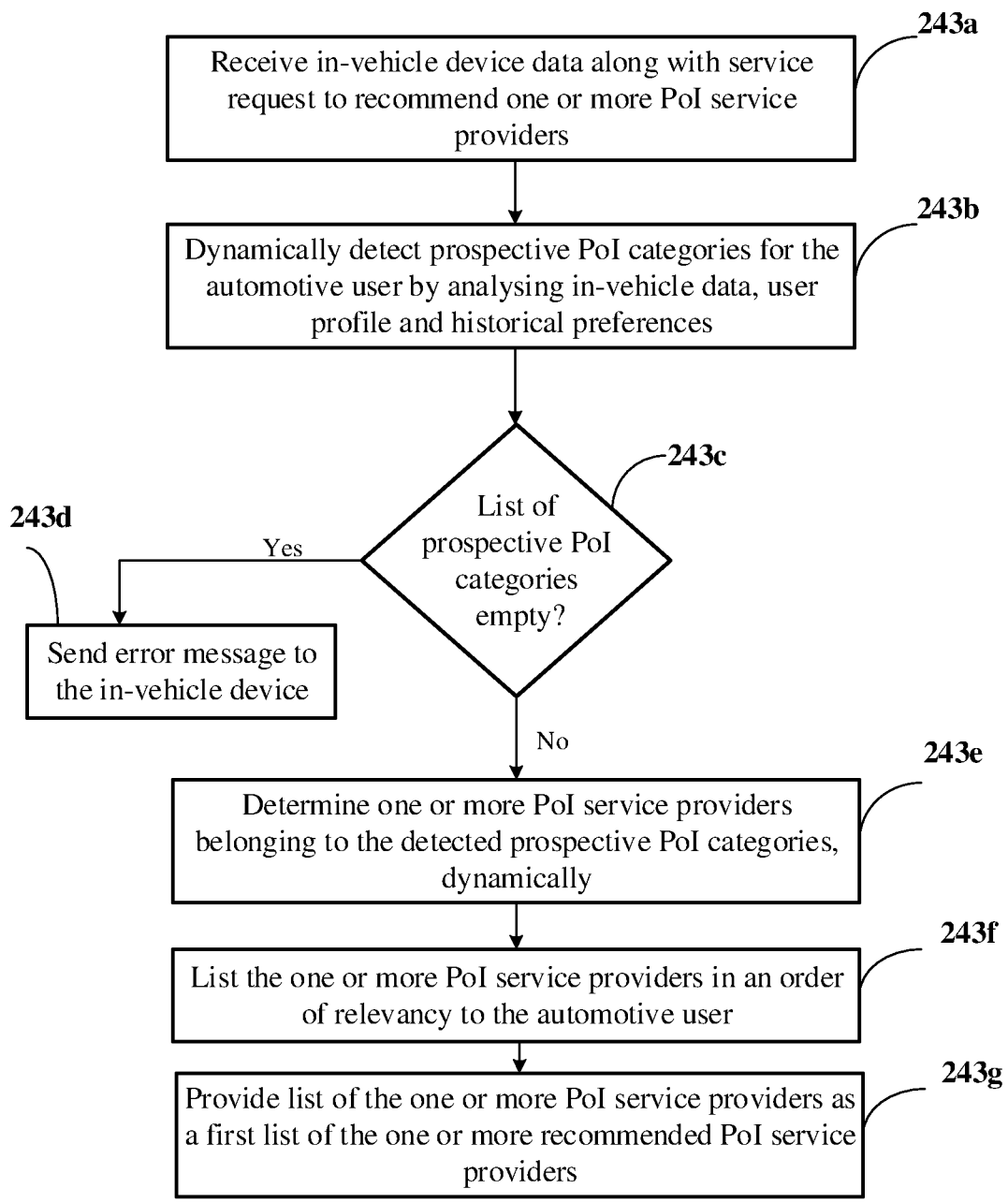
FIG. 2E shows a flowchart illustrating a method of dynamically providing first list of one or more recommended PoI service providers in accordance with some embodiments of the present disclosure.
Figure 2F:
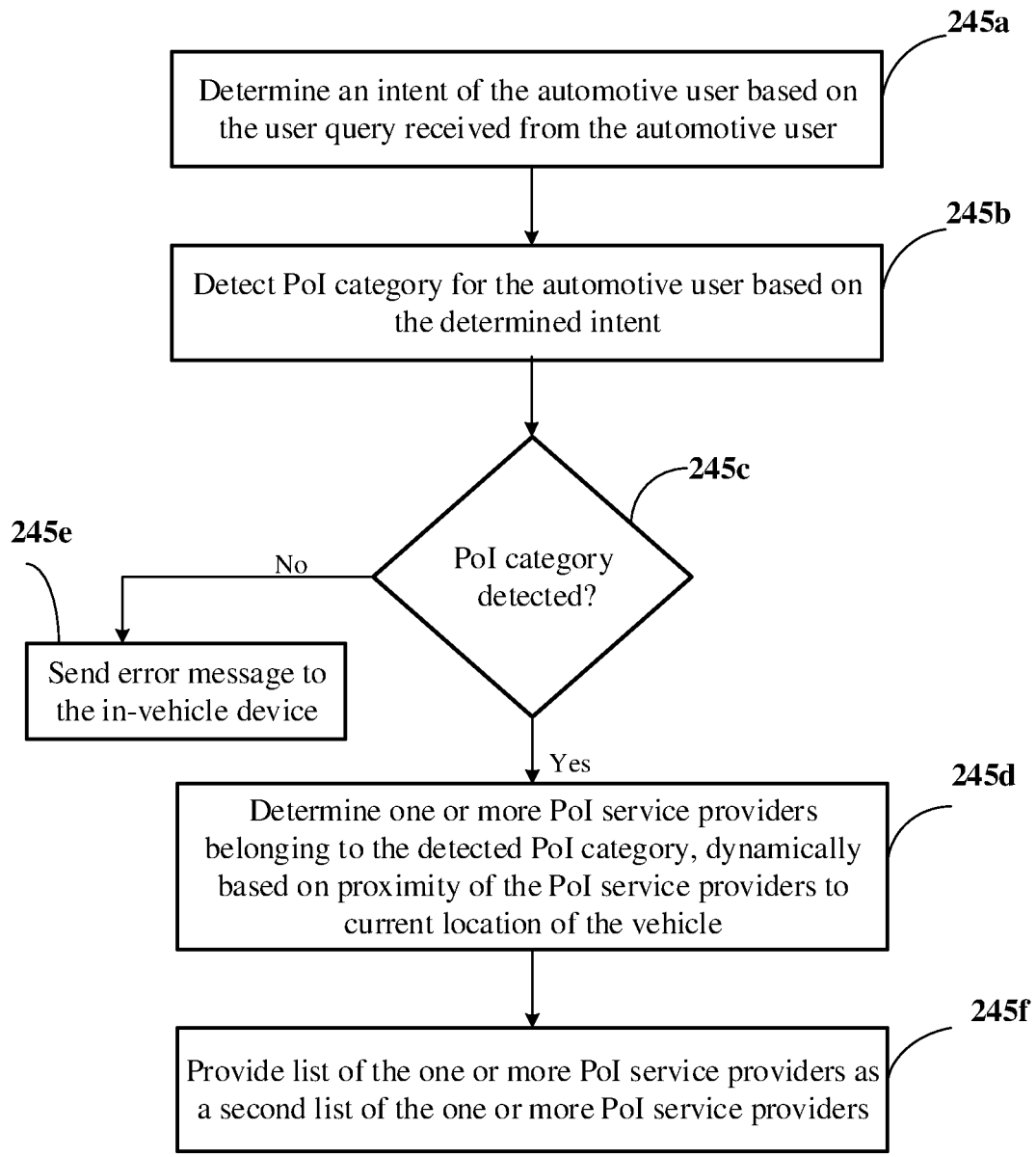
FIG. 2F shows a flowchart illustrating a method of dynamically providing second list of one or more PoI service providers based on a user query in accordance with some embodiments of the present disclosure.

FIG. 2A shows a detailed block diagram of a Point of Interest (PoI) service aggregator system for providing Just-In-Time (JIT) service to automotive users in accordance with some embodiments of the present disclosure;

In some implementations, the Point of Interest (PoI) service aggregator system 105 may include data 203 and modules 205. As an example, the data 203 is stored in the memory 113 configured in the PoI service aggregator system 105 as shown in the FIG. 2. In one embodiment, the data 203 may include input data 207, service provider data 209, first list data 211, in-vehicle device data 213, second list data 215, feedback data 217, and other data 219.

In some embodiments, the data 203 may be stored in the memory 113 in form of various data structures. Additionally, the data 203 can be organized using data models, such as relational or hierarchical data models. The other data 219 may store data including user profile, historical preferences of automotive user, temporary data and temporary files, generated by the modules 205 for performing the various functions of the PoI service aggregator system 105.

In some embodiments, the data 203 stored in the memory 113 may be processed by the modules 205 of the PoI service aggregator system 105. The modules 205 may be stored within the memory 113. In an example, the modules 205 communicatively coupled to the processor 109 configured in the PoI service aggregator system 105, may also be present outside the memory 113 as shown in FIG. 2A and implemented as hardware. As used herein, the term modules 205 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, an on-boarding module 223, a recommending module 225, a query based suggestion module 227, a synchronization module 229, a Just-In-Time (JIT) service enabling module 231, feedback receiving module 233, cancelling module 235 and other modules 237. The other modules 237 may be used to perform various miscellaneous functionalities of the PoI service aggregator system 105. It will be appreciated that such aforementioned modules 205 may be represented as a single module or a combination of different modules.

In some embodiments, the receiving module 221 may receive a service request from an automotive user of a vehicle 101. The automotive user may send the service request through one of one or more in-vehicle devices 103. As an example, the in-vehicle devices 103 may include, but not limited to, a driver infotainment system, a heads-up display, a rear-seat entertainment system and the like. The service request may include, information related to a preferred PoI service provider, a request to recommend one or more PoI service providers 107, or a request to list one or more PoI service providers 107 based on a user query. The received information with the service request may be stored as the input data 207.

In some embodiments, the communication between in-vehicle devices 103, the PoI service aggregator system 105, and the one or more PoI service providers 107 may be performed using a specialized text-based messaging protocol referred as Simple and Reliable Service Delivery Protocol for Automotive (SRSDPA). FIG. 2B shows a high-level message structure of the SRSDPA protocol. As shown in the FIG. 2B(1), the high-level message structure may include, but not limited to, a protocol message, a message descriptor, message data, a message type and a message sequence number. As an example, the message types may include, but not limited to, "REQUEST", "RESPONSE", "UPDATE", "NOTIFICATION" and "SUGGESTION". FIG. 2B(3) shows a table indicating description (purpose) of each of the aforementioned message types.

FIG. 2B(2) shows a structure of message data for "Request/"Response" message types. As shown in the FIG. 2B(2), the message data for a Request message type, may include, but not limited to, request type and request payload. Similarly, the message data for a Response message type, may include, but not limited to, request type and response payload, as shown in the FIG. 2B(2). The response payload may include, but not limited to, an error code and response data as shown in the FIG. 2B(2).

In some embodiments, table in FIG. 2B(4) shows exemplary request types and their corresponding description. In some embodiments, table in FIG. 2B(5) shows exemplary error codes and their corresponding description.

In some embodiments, since the SRSDPA protocol is for an automotive environment, there may be conditions when the vehicle 101 may frequently enter poor signal zones which may breakdown existing transport channels and may also make the communication unreliable. To overcome and recover from such conditions, the SRSDPA protocol may make use of a Message Sequence Number (MSN) which is a monotonically increasing number assigned by the sender of a request message, update message or a notification message. In some embodiments, the MSN may be maintained independently by the sender and the receiver. In some embodiments, message types such as updates and notifications do not require any explicit acknowledgement or response from the receiver as they are "just for information". However, when the message type is of the form "Request/Response", the receiver may act upon the message received from the sender and send an appropriate response. In such scenarios, the sender of a message may usually preserve a last sent message in a buffer so that it can be used for retransmission, if required. Whenever a response is received, the MSN in the message may be compared with the MSN in the message which was last sent. If the MSN is smaller, the message may be ignored as it may have arrived out of order due to issues in the underlying network transport. Similarly, any random response arriving with an MSN greater than the MSN of the last sent message may be ignored.

In some embodiments, if the sender does not receive a response within a certain time period though the message is of the form "Request/Response", there is a timeout which may indicate a communication failure. If the underlying transport provides a mechanism to signal a communication failure, the sender may wait for the communication to be re-established either automatically or through some trigger. Alternatively, the sender may re-send the request and wait for a specified time. This process may continue either till an appropriate response is received from the receiver or specified number of retries are exhausted for the sender.

In some embodiments, the receiver of a message preserves the last received message in a buffer and continues to prepare a response. In case, the communication breaks down before a request is received, it can be handled through the retry mechanism at the sender's end. If the receiver has already received a message but has been unable to respond due to a communication failure, the receiver may either choose to wait for communication to be restored or continue retrying for a specified number of times. In case the receiver is unaware about the response not reaching the sender of the request, the receiver can respond once a request with MSN equal to that of last received message is received. All other messages having MSN less than the last message can be safely ignored.

Referring back to FIG. 2A, the on-boarding module 223 may dynamically on-board the preferred PoI service provider to a Just-In-Time (JIT) service network. In some embodiments, the service request received from the user may include information related to the preferred PoI service provider. In some embodiments, the service request received from the automotive user may be in Request/Response message format as shown in FIG. 2C(1).

In some embodiments, in the above Request/Response message format, message data would include "EMAIL ID" i.e., contact details of the preferred PoI service provider.

Such contact details provided by the automotive user may be used by the on-boarding module 223 for requesting the preferred PoI service provider to on-board the JIT service network. In some embodiments, the preferred PoI service provider may join the JIT service network temporarily to serve the automotive user. In some other embodiments, the preferred PoI service provider may permanently join the JIT service network.

In some embodiments, response to the aforementioned service request may be Response message format as shown in FIG. 2C(2). In some embodiments, the response may be sent to the in-vehicle device 103 of the automotive user by the PoI service aggregator system 105. In this scenario, ERROR_CODE may be one of "NO_ERROR" or "INVALID_REQUEST". In some embodiments, the ERROR_CODE "NO_ERROR", is used in the Response message, when the service request of the automotive user is successfully received and processed by the PoI service aggregator system 105. In some other embodiments, the ERROR_CODE "INVALID_REQUEST" is used when the service request is disallowed due to improper formatting.

In some embodiments, the preferred PoI service provider indicated by the automotive user via the service request may not be a part of pre-registered JIT service providing network. Therefore, the on-boarding module 223 may dynamically on-board such preferred PoI service provider to the JIT service network. In some embodiments, on-boarding module 223 may include performing the steps as shown in the FIG. 2D.

At block 241a, the on-boarding module 223 may send an on-board request to the preferred PoI service provider, using the contact details provided by the automotive user, in response to the service request received from the automotive user. In some embodiments, the on-board request may inform the preferred PoI service provider about number of potential customers the preferred PoI service provider may stand to gain by onboarding the JIT service network. In some embodiments, the number of potential customers may be determined based on a history of such onboard requests made previously by other automotive users.

At block 241b, the on-boarding module 223 may receive a registration request in response to the on-board request. In some embodiments, if the preferred PoI service provider is willing to on-board the JIT service network, the preferred PoI service provider may click a link provided in the on-board request. The link provided in the on-board request may guide the preferred PoI service provider to the on-boarding portal of the JIT service network. The preferred PoI service provider may then provide necessary details required for on-boarding, in the on-boarding portal, and agree to terms and conditions related to on-boarding. On the contrary, if an already registered PoI service provider wants to offboard from the JIT service network, such PoI service provider may send a de-registration request to the on-boarding module 223. At block 241c, the on-boarding module 223 may validate the registration request to ensure presence of each of one or more parameter values required for registration. In some embodiments, one or more parameters required for registration may include, but not limited to, the PoI service provider name, PoI service provider location (latitude and longitude), PoI service provider category and PoI service provider endpoint which could be a Uniform Resource Locator (URL), for instance.

On the contrary, for a de-registration request, the on-boarding module 223 may validate the deregistration request to ensure presence of each of one or more parameter values required for de-registration. As an example, the parameter required for de-registration may be a unique identifier which was assigned to the PoI service provider at the time of registration.

At block 241d, the on-boarding module 223 may check whether the registration request received from the preferred PoI service provider or the de-registration request received from the PoI service provider who is already registered in the JIT service providing network, is valid. In some embodiments, the validity of the registration request or a de-registration request may include checking whether the registration request or a de-registration request are correctly formatted and include each of the one or more parameter values required for registration or de-registration. In some embodiments, if the registration request or the de-registration request is determined to be valid, the method may proceed to block 241e via "Yes". In some embodiments if the registration request or de-registration request is determined to be not valid, the method may proceed to block 241f via "No".

At block 241e, the on-boarding module 223 may on-board the preferred PoI service provider into the JIT service providing network, by accepting the registration request and adding the preferred PoI service provider to a PoI service provider database associated with the PoI service aggregator system 105. In some embodiments, before adding the preferred PoI service provider to a PoI service provider database, the on-boarding module 223 may create a unique Identifier for the preferred PoI service provider.

Similarly, the on-boarding module 223 may enable the PoI service provider to de-register from the JIT service providing network, by accepting the de-registration request, and removing the PoI service provider 107 from the PoI service provider database.

At block 241f, the on-boarding module 223 may send an error message such as "INVALID_REQUEST" to the preferred PoI service provider who is attempting to on-board the JIT service providing network, and may request the preferred PoI service provider to provide each of the one or more parameter values required for registration in a correct format.

Similarly, the on-boarding module 223 may send an error message such as "INVALID_REQUEST" to the PoI service provider 107 who is attempting to off-board the JIT service providing network, and may request the PoI service provider 107 to provide each of the one or more parameter values required for de-registration in a correct format.

At block 241g, the on-boarding module 223 may send an on-boarding success status message to the preferred PoI service provider, upon successful registration and on-boarding.

Similarly, the on-boarding module 223 may send an off-boarding success status message to the PoI service provider 107 upon successful de-registration and off-boarding. In some embodiments, each of the one or more parameter values of the preferred PoI service provider may be stored as the service provider data 209.

In some embodiments, when the preferred PoI service provider is unwilling to on-board the JIT service network, or when the preferred PoI service provider is temporarily or permanently closed, or when the preferred PoI service provider does not exist, the PoI service aggregator system 105 may recommend one or more alternative PoI service providers similar to the preferred PoI service provider, to the automotive user. In some embodiments, the PoI service aggregator system 105 may state the reason due to which one or more alternative PoI service providers are being recommended, to the automotive user.

Referring back to the FIG. 2A, the recommending module 225 may dynamically provide a first list of one or more recommended PoI service providers 107 to the automotive user. In some embodiments, the recommending module 225 may dynamically provide a first list of one or more recommended PoI service providers 107, upon receiving the service request that includes a request to recommend one or more PoI service providers 107. The first list of one or more recommended PoI service providers 107 may be stored as the first list data 211.

In some embodiments, prior to receiving the service request, the PoI service aggregator system 105 may receive a NEW_TOKEN request for a token number. The PoI service aggregator system 105 may issue a token number to the automotive user, in response to the NEW_TOKEN request. The token number may be a unique number which is required to be used by the automotive user in all future request messages. In some embodiments, the token number thus issued may have a validity period determined by the various policies enforced in the PoI service aggregator system 105. As an example, the validity period may be until end of current session, or for certain number of hours or for certain number of interactions or for certain type of interactions and the like. In some embodiments, the token number may be used for tracking current interactions between the automotive user via the in-vehicle device 103 and the PoI service aggregator system 105, and also to collect data related to the interactions properly, which in turn ensures better recommendations to the automotive user.

In some embodiments, the NEW_TOKEN Request message may be as shown in FIG. 2C(3). In this Request message for new token, VEHICLE_ID may refer to a unique ID which enables the PoI service aggregator system 105 to identify the vehicle 101. In some embodiments, Response message for the aforementioned request message may be as shown in FIG. 2C(4).

In the Response message as shown in the FIG. 2C(4),
  Error code may be at least one of NO_ERROR, INVALID_VID, SYSTEM_FAILURE (please refer table in FIG. 2B(5) for description of the Error codes)
  Token number may refer to the unique string which is returned in case of "NO_ERROR" i.e., when the request message is successfully processed. This is the token number which should be tagged in all future request messages, until the expiry of the validity of the token number.

Upon receiving the token number, the automotive user may send the service request to recommend one or more PoI service providers 107, by mentioning the token number in the service request. In some embodiments, the recommending module 225 may include performing the steps as shown in the FIG. 2E, upon receiving the service request from the automotive user to recommend the one or more PoI service providers 107.

At block 243a, the recommending module 225 may receive in-vehicle device data 213 along with the service request to recommend the one or more PoI service providers 107. In some embodiments, the in-vehicle device data received from the in-vehicle device 103 may include, but not limited to, local temperature, local time, fatigue level of the automotive user and passenger count. In some embodiments, the in-vehicle device data may be collected by one or more sub-systems configured in the vehicle 101. Further, the recommending module 225 may also receive current location of the vehicle 101.

In some embodiments, the recommending module 225 may receive the service request for recommending the one or more PoI service providers 107 in a POI_RECOMMEND Request message format as shown in FIG. 2C(5).

In this message format,
  Token number may refer to a string or number returned by the PoI service aggregator system 105 in response to NEW_TOKEN request.
  Inputs may refer to the in-vehicle device data. The inputs may be received based on capability or the vehicle sub-systems configured in the vehicle 101.
  Current location may refer to location of the vehicle 101 at a given point of time.
  Max results may refer to upper limit on number of results to be returned as a recommendation At block 243b, the recommending module 225 may dynamically detect prospective PoI categories for the automotive user, by analysing the in-vehicle device data, user profile of the automotive user, historical preferences of the automotive user and similarity of the automotive user with other automotive users travelling or travelled along same route. In some embodiments, the user profile of the automotive user and the historical preferences of the automotive user may be stored in the memory 113. In some embodiments, similarity of the automotive user with other automotive users may be determined in real-time, by the recommending module 225.

In some embodiments, the in-vehicle device data 213 may influence recommendation of the one or more PoI service providers 107. For instance, when the fatigue level of the automotive user is high, the recommending module 225 may infer that the automotive user may need some refreshment and that it may not be safe for the automotive user to drive long distances in the current situation. In another instance, when external temperature (local temperature) is on the higher side, the recommending module 225 may infer that, recommending an ice-cream parlour or cold drinks bar could be a suitable option than a shop serving hot drinks. In yet another instance, when the local time is for example, around 10:00 PM (late in the night), the recommending module 225 may infer that, it may not be apt to recommend outlets which close early. In yet another instance, when the passenger count is more than one, i.e., when the automotive user is not alone in the vehicle 101, the recommending module 225 may infer that, it would be more apt for the automotive user to be visiting a restaurant for dinner than to be shopping for groceries.

In some embodiments, the recommending module 225 may use the in-vehicle device data 213 as explained above to build an aggregated context. Upon building the aggregated context, the recommending module 225 may analyze the user profile and the historical preferences of the automotive user to identify PoI categories that the automotive user was previously interested in. As an example, if the automotive user is a frequent visitor to coffee shops when the weather is cold, then the recommending module 225 may detect PoI categories related to coffees shops as the prospective PoI category. This may be referred as content based filtering. Further, the recommending module 225 may detect PoI categories preferred by other automotive users of similar profiles as the automotive user, as the prospective PoI categories for the automotive user. This may be referred as collaborative filtering.

As an example, if the aggregated context indicates that, the weather is hot and the fatigue level of the driver is high, the recommending module 225 may select the PoI category "ice cream parlors" and "Juice outlets" as the prospective PoI categories for the automotive user. In some embodiments, the recommending module 225 may also look at the user profile and the historic preferences of the automotive user. As an example, consider the user profile indicates that the automotive user likes Coffee, and the historical preferences indicate that, the automotive user has frequently stopped at coffee outlets, even when the weather is hot, then the recommending module 225 may select the PoI category "Café" or "Coffee Outlets" as the prospective PoI categories.

At block 243c, upon detecting the prospective PoI categories, the recommending module 225 may check whether list of detected prospective PoI categories is empty. If the list of detected prospective PoI categories is empty, the method may proceed to block 243d via "Yes". If the list is not empty, then the method may proceed to block 243e via "No".

At block 243d, the recommending module 225 may return an error message to in-vehicle device 103 of the vehicle 101. In some embodiments, the error message may indicate that, there are no prospective PoI categories for the current context along the route through which the vehicle 101 is travelling, and that the automotive user can send another service request after a predefined time period. As an example, the error message may be "QUERY_FAILED", which indicates that the query in the service request could not be resolved.

At block 243e, the recommending module 225 may determine the one or more PoI service providers belonging to the detected prospective PoI categories, dynamically. As an example, if the prospective PoI category is a "Café", the recommending module 225 may determine the one or more PoI service providers belonging to the PoI category "Café". As an example, all the PoI service provider outlets that serve hot and cold beverages may be selected as the one or more PoI service provides belonging to the prospective PoI category "Café".

At block 243f, the recommending module 225 may list the one or more PoI service providers 107 thus determined, in an order, based on a degree of relevancy of the one or more PoI service providers 107 to the automotive user. In some embodiments, the recommending module 225 may list the one or more PoI service providers 107 that are relevant to the automotive user, based on one or more predefined rules. As an example, if the automotive user has visited restaurants that serve coffee more often than small coffee outlets in the previous instances, the recommending module 225 may identify the restaurants that serve coffee as more relevant to the automotive user than small coffee outlets that serve coffee. Further, as an example, the PoI service providers 107 that are proximal to current location of the vehicle 101 in which the automotive user is travelling, may be identified as more relevant to the automotive user, than the PoI service providers 107 that are beyond a predefined distance from the current location of the vehicle 101. As an example, PoI service provides beyond 6 kms may be considered less relevant that the PoI service providers that are within 6 Kms. Therefore, in this instance, the exemplary predefined rules could be as shown below:
  If distance of the PoI service provider from current location>6 Kms, then relevancy=3
  If distance of the PoI service provider from current location=6 Kms, then relevancy=2
  If distance of the PoI service provider from current location<6 Kms, then relevancy=1

At block 243g, the recommending module 225 may provide the listed one or more PoI service providers 107 to the automotive user, as the first list of the one or more recommended PoI service providers 107. In some embodiments, the first list of the one or more recommended PoI service providers 107 may be transmitted to one of the one or more in-vehicle devices 103 configured in the vehicle 101, and displayed on a display unit associated with the in-vehicle device 103. In some embodiments, the first list of the one or more recommended PoI service providers 107 may be provided in a message format "POI_RECOMMEND" response message as shown in FIG. 2C(6).

In the above Response message,
  Error code may refer to one of "NO_ERROR", "QUERY_FAILED". In some embodiments, "NO_ERROR" means that the service request has been processed without any error, and "QUERY_FAILED" may indicate that the query in the service request could not be resolved.
  Number of results may refer to total number of PoI service providers listed in the first list as recommendation for the automotive user, when the error code is "NO_ERROR".
  PoI 1 . . . . PoI n may refer to the PoI service providers listed in first list as recommendation, when the error code is "NO_ERROR".

In the components of the field "PoI 1 . . . PoI n" as shown in FIG. 2C(6),
  PoI name/address/phone number/email may refer to contact details of the one or more recommended PoI service providers 107;
  PoI location may refer to latitude and longitude of the one or more recommended PoI service providers 107;
  PoI service provider service endpoint: PoI endpoint which received requests from clients (value of this field will be blank, if the PoI service provider is not on-boarded to the JIT service providing network);
  Opening time/Closing time may refer to business hours of the one or more recommended PoI service provider 107;
  Image URL may refer to URL for downloading representative image of the one or more recommended PoI service providers 107.

In some embodiments, upon receiving the first list of the one or more recommended PoI service providers 107, the automotive user may provide feedback to the PoI service aggregator system 105. The feedback may be related to relevancy of the one or more recommended PoI service providers in the first list. The feedback thus received may be stored as the feedback data 217. In some embodiments, the PoI service aggregator system 105 may receive the feedback in a "RECORD_RELEVANCE_FEEDBACK" request message format as shown in FIG. 2C(7).

In this message format,
  Token number may refer to a string or number returned by the PoI service aggregator system 105 in response to NEW_TOKEN request.
  Max rating may refer to non-zero positive integer which defines upper limit of rating
  User rating may refer to feedback provided by the automotive user regarding relevancy of the one or more recommended PoI service providers 107. The value of user rating would be between zero and the max rating.

In some embodiments, the PoI service aggregator system 105 may respond to the feedback message in a "RECORD_RELEVANCE_FEEDBACK" response message format as shown in FIG. 2C(8).

In this message format,
  Error code may refer to one of "NO_ERROR", "INVALID_FEEDBACK", "INVALID_REQUEST" and "UNEXPECTED REQUEST". In some embodiments, "NO_ERROR" means that the request has been processed without any error, "INVALID_REQUEST"

means that the request was disallowed due to improper formatting, "UNEXPECTED REQUEST" means that the request was disallowed because it was sent out of context e.g., trying to cancel a request which was never placed, and "INVALID_FEEDBACK" means that the Feedback value did not fall within accepted range.

In some embodiments, the automotive user may opt to receive proactive PoI service provider suggestions from the PoI service aggregator system 105 based on current location of the automotive user and historical preferences or interactions of the automotive user, which have been previously recorded by the PoI service aggregator system 105.

The automotive user may receive such suggestions via the in-vehicle device 103, by registering with the PoI service aggregator system 105 and may stop receiving such suggestions by unregistering, when the automotive user does not wish to receive any suggestions. The in-vehicle device 103 may keep the PoI service aggregator system 105 updated with location update messages of the vehicle 101, in order to enable the PoI service aggregator system 105 to provide suggestions relevant to the current location of the vehicle 101.

In some embodiments, the REGISTER_FOR_SUGGESTIONS request message may be of the format as shown in FIG. 2C(9): In this message format, Token number may refer to a string or number returned by the PoI service aggregator system 105 in response to NEW_TOKEN request.

In some embodiments, the REGISTER_FOR_SUGGESTIONS response message may be of the format as shown in FIG. 2C(10). In this message format, Error code may refer to one of "NO_ERROR", "INVALID_REQUEST", and "UNEXPECTED REQUEST". In some embodiments, "NO_ERROR" means that the request has been processed without any error, "INVALID_REQUEST" means that the request was disallowed due to improper formatting, and "UNEXPECTED REQUEST" means that the request was disallowed because it was sent out of context e.g., trying to cancel a request which was never placed.

In some embodiments, the UNREGISTER_FOR_SUGGESTIONS request message may be of the format as shown in FIG. 2C(11). In this message format, Token number may refer to a string or number returned by the PoI service aggregator system 105 in response to NEW_TOKEN request.

In some embodiments, the UNREGISTER_FOR_SUGGESTIONS response message may be of the format as shown in FIG. 2C(12). In this message format, Error code may refer to one of "NO_ERROR", "INVALID_REQUEST", and "UNEXPECTED REQUEST", as explained above.

In some embodiments, structure of message data for suggestion messages may be as shown in FIG. 2C(13). In this message format, PoI name may refer to name of the suggested PoI service provider;

PoI location may refer to latitude and longitude of the suggested PoI service provider;

PoI service provider service endpoint may refer to PoI endpoint which received requests from clients i.e., automotive users.

Image URL may refer to URL for downloading representative image of the suggested PoI service provider.

In some embodiments, structure of message data for updating location of the vehicle 101 may be as shown in FIG. 2C(14): In this message format, Token number may refer to a string or number returned by the PoI service aggregator system 105 in response to NEW_TOKEN request.

Current location may refer to latitude and longitude of the vehicle 101.

Referring back to FIG. 2A, the query based suggestion module 227 may dynamically provide the second list of one or more PoI service providers 107 based on user query of the automotive user. In some embodiments, the second list of the one or more PoI service providers 107 may be provided when the PoI service aggregator system 105 receives the service request including a request to list one or more PoI service providers 107 based on the user query. The one or more PoI service providers 107 dynamically provided by the query based suggestion module 227 may be stored as the second list data 215.

In some embodiments, prior to receiving the service request, the PoI service aggregator system 105 may receive a NEW_TOKEN request for a token number, from the in-vehicle device 103 of the automotive user. The PoI service aggregator system 105 may issue a token number to the automotive user, in response to the NEW_TOKEN request. The token number may be a unique number which is required to be used by the automotive user in all future request messages. In some embodiments, the token number thus issued may have a validity period determined by the various policies enforced in the PoI service aggregator system 105. As an example, the validity period may be until end of current session, or for certain number of hours or for certain number of interactions or for certain type of interactions and the like. In some embodiments, the token number may be used for tracking current interactions between the automotive user via the in-vehicle device 103 and the PoI service aggregator system 105, and also to collect data related to the interactions properly, which in turn ensures better recommendations to the automotive user.

Upon receiving the token number, the automotive user may send the service request to recommend one or more PoI service providers 107, by mentioning the token number in the service request. In some embodiments, the query based suggestion module 227 may include performing the steps as shown in the FIG. 2F, upon receiving the service request including a request to list one or more PoI service providers 107 based on the user query.

At block 245a, the query based suggestion module 227 may determine an intent of the automotive user based on the user query. As an example, the user query may be an input string which may be directly or indirectly input by the automotive user. As an example, the automotive user may orally say a phrase such as "Want to have some coffee" to a microphone configured in the in-vehicle device 103. In some embodiments, the Human Machine Interface (HMI) component of the in-vehicle device 103 may capture and convert the phrase into a corresponding text string and may provide the text string as the user query to the PoI service aggregator system 105. This may be referred as an indirect way of providing an input by the automotive user. In some embodiments, the direct method may include providing the user query in the form of a text string itself directly, via the in-vehicle device 103.

In some embodiments, the query based suggestion module 227 may receive the user query in a POI_QUERY Request message format as shown in the FIG. 2G(1).

Token number may refer to a string or number returned by the PoI service aggregator system 105 in response to NEW_TOKEN request.

Input string may be the user query provided by the automotive user. As an example, "Want to have some coffee".

Current location may refer to latitude and longitude of the vehicle 101.

Max results may refer to an upper limit on number of results returned from the user query.

In some embodiments, the query based suggestion module 227 may determine the intent of the automotive user using language understanding services. As an example, the language understanding services may be cloud based services that apply custom machine learning intelligence to a user's utterance to identify or predict meaning of such utterance and in the process, predicting intent as well. An exemplary language understanding service may be Microsoft's® LUIS. As an example, consider the user query is "want to have some coffee". From this user query, the query based suggestion module 227 may infer the intent of the automotive user as "user wishes to have coffee".

At block 245*b*, the query based suggestion module 227 may detect PoI category for the automotive user based on the determined intent. In the above example, the determined intent of the automotive user is inferred as "user wishes to have coffee". Based on such determined intent, the query based suggestion module 227 may detect the PoI category relevant to the user query as "Cafés" or "Restaurants".

At block 245*c*, the query based suggestion module 227 may check whether PoI category was successfully detected based on the intent of the automotive user. If the PoI category for the automotive user is detected, the method may proceed to block 245*d* via "Yes". If the PoI category is not determined for the automotive user then the method may proceed to block 245*e* via "No".

At block 245*d*, the query based suggestion module 227 may determine the one or more PoI service providers 107 belonging to the detected PoI category, dynamically, based on proximity of the one or more PoI service providers 107 to a current location of the automotive user. As an example, if the PoI category is "Café" or "Restaurants", the query based suggestion module 227 may determine the one or more PoI service providers 107 belonging to the PoI category "Café" or "Restaurants" proximal to the current location of the automotive user, for example, with 3-5 kms from the current location of the automotive user. As an example, all the PoI service provider outlets that serve coffee within the proximity range, may be selected as the one or more PoI service providers 107 belonging to the detected PoI category "Café" or "Restaurants".

At block 245*e*, the query based suggestion module 227 may return an error message to in-vehicle device 103 of the vehicle 101. In some embodiments, the error message may indicate that, there is no PoI category for the determined intent of the automotive user, along the route through which the vehicle 101 is travelling, and that the automotive user can send another service request after a predefined time period. As an example, the error message may be "QUERY_FAILED" message, which indicates that the query in the service request could not be resolved.

At block 245*f*, the query based suggestion module 227 may provide list of the one or more PoI service providers 107 thus determined, to the automotive user, as the second list of one or more PoI service providers 107. In some embodiments, the second list of the one or more PoI service providers 107 may be transmitted to one of the one or more in-vehicle devices 103 configured in the vehicle 101, and displayed on the display unit associated with the in-vehicle device 103. In some embodiments, the second list of the one or more PoI service providers 107 may be provided to the automotive user in a message format "POI_RECOMMEND" response message as shown in FIG. 2G(2).

In this Response message,

Error code may refer to one of "NO_ERROR", "QUERY_FAILED". In some embodiments, "NO_ERROR" means that the service request has been processed without any error, and "QUERY_FAILED" may indicate that the query in the service request could not be resolved.

Number of results may refer to total number of PoI service providers listed in the second list for the automotive user, when the error code is "NO_ERROR".

PoI 1 . . . . PoI n may refer to the PoI service providers listed in second list, when the error code is "NO_ERROR".

In the components of the field "PoI 1 . . . PoI n" as shown in FIG. 2G(2),

PoI name/address/phone number/email may refer to contact details of the one or more PoI service providers 107;

PoI location may refer to latitude and longitude of the one or more PoI service providers 107;

PoI service provider service endpoint: PoI endpoint which received requests from clients (value of this field will be blank, if the PoI service provider is not on-boarded to the JIT service providing network);

Opening time/Closing time may refer to business hours of the one or more PoI service providers 107;

Image URL may refer to URL for downloading representative image of the one or more PoI service providers 107.

In some embodiments, upon receiving the second list of the one or more recommended PoI service providers 107, the automotive user may provide feedback to the PoI service aggregator system 105. The feedback may be related to relevancy of the one or more PoI service providers 107 listed in the second list, to the intent of the automotive user. Feedback thus received from the automotive user may be stored as the feedback data 217. In some embodiments, the PoI service aggregator system 105 may receive the feedback in the "RECORD_RELEVANCE_FEEDBACK" request message format and the PoI service aggregator system 105 may respond to the feedback message in the "RECORD_RELEVANCE_FEEDBACK" response message format.

In some embodiments, feedback may be stored as zero, when the automotive user does not provide any feedback. This may be inferred as "No feedback".

Referring back to the FIG. 2A, the synchronization module 229 may establish a real-time synchronization between a candidate PoI service provider and the automotive user. In some embodiments, the candidate PoI service provider may be one of the preferred PoI service provider on-boarded to the JIT service providing network or the PoI service provider selected by the automotive user from the first list or the second list. In some embodiments, the synchronization module 229 may establish the real-time synchronization between the candidate PoI service provider and the automotive user by performing the steps as shown in the FIG. 2H(1).

At block 247*a*, the synchronization module 229 may receive a selection of the candidate PoI service provider, from the automotive user. In some embodiments, if one of the first list or the second list is provided to the automotive user, the automotive user may select the PoI service provider of his choice from the first list or the second list and may provide such selection to the PoI service aggregator system 105, who is then considered as the candidate PoI service provider. In the scenarios where the automotive user had initially provided information of the preferred PoI service provider in the service request, there is no further selection from the automotive user. The preferred PoI service provider itself is considered as the candidate PoI service provider.

At block 247b, the synchronization module 229 may facilitate the interface between the candidate PoI service provider and the automotive user. The interface may enable the candidate PoI service provider to send a service catalog to the automotive user. In some embodiments, the candidate PoI service provider may send the service catalog to the automotive user in response to a fetch request received from the automotive user, for the service catalog. The automotive user may communicate with the candidate PoI service provider using the PoI service provider endpoint details provided by the PoI service aggregator system 105 to the automotive user. In some embodiments, the candidate PoI service provider may receive the fetch request from the automotive user via a SERVICE_CATALOG_FETCH request message along with the token number, via the interface facilitated by the synchronization module 229. The message format of the SERVICE_CATALOG_FETCH request message may be as shown in FIG. 2H(2).

In this message format, token number refers to the unique string or a number provided by the PoI service aggregator system 105 to the automotive user. Such token number is used in the all the future interactions of the current context.

At block 247c, the candidate PoI service provider may check whether the token is valid. If the token number is valid, the method may proceed to block 247d via "Yes". If the token number is invalid, the method may proceed to block 247e via "No".

At block 247d, the candidate PoI service provider may send service catalogue to the automotive user by responding to the fetch request of the automotive user using SERVICE_CATALOG_FETCH response message via the interface facilitated by the synchronization module 229. The message format of the SERVICE_CATALOG_FETCH response message may be as shown in FIG. 2H(3).

In this message format,
Error code refers to one of "NO_ERROR", "INVALID_REQUEST", and "UNEXPECTED REQUEST", as explained above in this document. Error code may also refer to "SYSTEM_FAILURE" which means there is some catastrophic failure due to which the fetch request could not be processed, and UNAUTHORIZED which means that the token used in the fetch request is invalid. For successful processing of the fetch request, the error code should be "NO_ERROR".
Item count refers to number of items in the service catalogue;
Item 1 to Item n refers to individual items in the service catalogue;
In the components as shown in FIG. 2H(3),
Item code refers to code that uniquely identifies the item in the service catalogue;
Description refers to textual description of the item in the service catalogue;
Quantity/unit refers to weight, volume, pieces, numbers and the like, per unit of the item;
Currency refers to currency in which the items are priced
Price/Unit refers to price per unit of the item in the specified currency
Image URL refers to URL provided to download representative image of the item.

In some embodiments, the service catalogue of the candidate PoI service provider may be displayed on the HMI of the in-vehicle device 103 of the vehicle 101.

At block 247e, the candidate PoI service provider may send UNAUTHORIZED error code to the automotive user, to indicate that the token number is invalid. In some embodiments, such error code may be displayed on the HMI of the in-vehicle device 103 of the vehicle 101. In some embodiments, upon receiving such error, the automotive user may send the SERVICE_CATALOG_FETCH request message yet again with a valid token number.

At block 247f, the candidate PoI service provider may receive an order request including a list of items ordered by the automotive user, from the service catalogue, via the interface facilitated by the synchronization module 229. In some embodiments, candidate PoI service provider may receive a list of items ordered by the automotive user, in a NEW_REQUEST request message. The message format of the NEW_REQUEST request message may be as shown in FIG. 2H(4).

In this message format,
Token refers to the token number as provided by the PoI service aggregator system 105 to the automotive user;
Item count refers to number of items selected from the service catalogue for order
Item 1 to Item n refers to individual items selected for order
Each of the fields "Item 1 to Item n" may include the components as shown in FIG. 2H(5). In the components,
Item code refers to code that uniquely identifies the items in the service catalogue
Number of units refers to the number of units of each item that the automotive user wants to order In some embodiments, upon receiving the list of items ordered by the automotive user, the candidate PoI service provider may either accept or reject the order based on the ability of the candidate PoI service provider to cater to the order. At block 247g, the candidate PoI service provider checks whether it can accept the order placed by the automotive user. If the candidate PoI service provider can accept the order placed by the automotive user, the method proceeds to block 247h via "Yes". If the candidate PoI service provider cannot accept the order placed by the automotive user, the method proceeds to block 247i via "No".

At block 247h, the candidate PoI service provider accepts the order and may send a success message to the automotive user, upon creating an order request based on the list of items ordered by the automotive user. In some embodiments, the success message may be a NEW_REQUEST response message which is sent to the automotive user.

In some embodiments, the message format of the NEW_REQUEST response message may be as shown in FIG. 2H(6): In this above message format,
Error code refers to NO_ERROR, UNAUTHORIZED, INVALID_REQUEST, UNEXPECTED_REQUEST, SYSTEM_FAILURE and CAPACITY_EXCEEDED. Purpose of each of these errors is explained in the FIG. 2B(5) in this document. The Error code should be set to "NO_ERROR" in order to proceed with the process.
Request number refers to tracking number allocated by the candidate PoI service provider for the current order
Currency refers to currency in which total bill amount for the current order is indicated
Bill amount refers to total bill amount for the current order.

At block 247i, the candidate PoI service provider may reject the order placed by the automotive user by sending a NEW_REQUEST response message to the automotive user, by setting the error code as "CAPACITY_EXCEEDED". Error code "CAPACITY_EXCEEDED" may indicate that the order accepting capacity of the candidate PoI service provider has exceeded a maximum number of orders. In some embodiments, the NEW_REQUEST response message at both the blocks 247h and 247i may be displayed on the HMI of the in-vehicle device 103 of the vehicle 101.

At block 247j, the candidate PoI service provider may dynamically set an update interval for receiving a status update from the automotive user, via the interface established between the candidate PoI service provider and the automotive user. In some embodiments, initially the candidate PoI service provider may negotiate the update interval with the automotive user. The candidate PoI service provider may receive a NEGOTIATE_UPDATE_INTERVAL request message with a proposed time interval from the automotive user via the in-vehicle device 103. The message format of the NEGOTIATE_UPDATE_INTERVAL request message may be as shown in FIG. 2G(3):

In this message format,
Request number refers to the number returned by the candidate PoI service provider to the automotive user, in response to the NEW_REQUEST request message sent to place an order.
Time unit refers to unit in which time interval is measured, for instance, seconds or minutes
Interval refers to time interval between updates, as proposed by the automotive user.

Upon receiving this request message, the candidate PoI service provider may respond, by sending a NEGOTIATE_UPDATE_INTERVAL response message with the error code "NO_ERROR", if the update interval proposed by the automotive user, is acceptable to the candidate PoI service provider. However, if the update interval proposed by the automotive user is unacceptable to the candidate PoI service provider, the candidate PoI service provider may respond with the error code "INTERVAL_REJECTED" along with a new update interval. The message format of the NEGOTIATE_UPDATE_INTERVAL response message may be as shown in FIG. 2G(4):

In this message format,
Error code refers to one of "NO_ERROR", "INTERVAL_REJECTED", "INVALID_REQUEST", and "UNEXPECTED_REQUEST". Purpose of each of the error codes is explained in the table in FIG. 2B(5).
Time unit refers to unit in which time interval is measured, for instance, seconds or minutes
Interval refers to time interval between updates, as proposed by the candidate PoI service provider.

In some embodiments, this exchange of NEGOTIATE_UPDATE_INTERVAL request/response messages may continue between the candidate PoI service provider and the automotive user, for negotiating the update interval, until an update interval which is acceptable by both the candidate PoI service provider and the automotive user is arrived at. The final agreed update interval upon negotiation may be dynamically set as the update interval for receiving a status update from the automotive user, by the candidate PoI service provider.

At block 247k, the candidate PoI service provider may receive the status update related to the arrival and the non-arrival events from the automotive user, at the dynamically set update interval. As an example, if the update interval is 5 minutes, the automotive user may send the status update to the candidate PoI service provider at every 5 minutes interval. In some embodiments, the status update may include, but not limited to, a current location of the automotive user i.e. current location of the vehicle 101, the estimated time of arrival at the candidate PoI service provider i.e. time at which the vehicle 101 is estimated to reach the candidate PoI service provider, and at least one of traffic update at the current location of the automotive user, emergency related updates such as accidents, order cancellation update, delay related updates such as delay due to stops on route, delay due to unexpected road blocks, delay due to unplanned waiting during the commute and the like, and re-routing updates.

In some embodiments, the automotive user may provide status update to the candidate PoI service provider using update_message. The message format of update_message is as shown in FIG. 2H(7). In this message format,
Request number refers to the number returned by the candidate PoI service provider to the automotive user, in response to the NEW_REQUEST request message sent to place an order.
Status refers to the current status of the vehicle 101. Explained further in the table provided in FIG. 2H(8).
ETA refers to the estimated time of arrival of the vehicle 101 at the candidate PoI service provider. ETA field further includes the components as shown in FIG. 2H(7):
Distance refers to current distance of the vehicle 101 from location of the candidate PoI service provider.
Time refers to time required to reach the location of the candidate PoI service provider.
Current speed refers to speed at which the vehicle 101 is moving.

The field "Status" in the update_message may include the status indications as shown in the table in FIG. 2H(8). The update messages play a critical role in ensuring that the candidate PoI service provider is informed about the current status of the automotive user who is travelling towards the location of the candidate PoI service provider. In some embodiments, the update messages enable the candidate PoI service provider to optimize their resources towards providing a better consumer experience. As an example, if the automotive user who has placed an order or has made reservations at the candidate PoI service provider is stuck due to a traffic jam or road blockade, the resources reserved for him (e.g., tables at a coffee shop or spaces in a parking lot) can be reallocated to ensure optimal usage.

In some embodiments, the automotive user may also opt to receive traffic updates and related information from the candidate PoI service provider while commuting towards the location of the candidate PoI service provider. As an example, if one of the roads which leads to the location of the candidate PoI service provider is blocked, the candidate PoI service provider may provide such real-time update to the automotive user, which will be displayed or played (audio) using the HMI of the in-vehicle device 103. Based on such real-time update, the automotive user may avoid the blocked road, which could save time for the automotive user to reach the location of the candidate PoI service provider. In some embodiments, the candidate PoI service provider may provide such updates in the form of notifications, if the automotive user registers to receive such notifications.

In some embodiments, the automotive user may register to receive the notification from the candidate PoI service provider using the REGISTER_FOR_NOTIFICATION request message, whose message format is as shown in FIG. 2H(9). In this message format, Request number is the number returned by the candidate PoI service provider in response to NEW_REQUEST request sent by the automotive user to place an order.

Upon receiving the register request message from the automotive user, the candidate PoI service provider may respond to the register request message by sending REGISTER_FOR_NOTIFICATION response message, whose message format is as shown in FIG. 2H(10).

In this message format,
Error code refers to one of "NO_ERROR", "INVALID_REQUEST" and "UNEXPECTED_REQUEST". In some embodiments, if the details provided by the automotive user are correct, then the candidate PoI service provider may accept the register request message and indicate the acceptance status to the automotive user by using error code as "NO_ERROR". When the register request is invalid, for example, if the request number is improperly formatted, then the register request will be rejected by indicating the error code "INVALID_REQUEST". Similarly, when the register request is unexpected, for instance, if the automotive user has not placed any order at the candidate PoI service provider, but is registering for notifications, then the register request will be rejected by indicating error code as "UNEXPECTED_REQUEST". In some embodiments, the automotive user may unregister the notification services from the candidate PoI service provider using the UNREGISTER_FOR_NOTIFICATION request message, whose message format is as shown in FIG. 2H(11). In this message format, Request number is the number returned by the candidate PoI service provider in response to NEW_REQUEST request sent by the automotive user to place an order.

Upon receiving the unregister request message from the automotive user, the candidate PoI service provider may respond to the unregister request message by sending UNREGISTER_FOR_NOTIFICATION response message, whose message format is as shown in FIG. 2H(12).

In this message format,
Error code refers to one of "NO_ERROR", "INVALID_REQUEST" and "UNEXPECTED_REQUEST". In some embodiments, if the details provided by the automotive user are correct, then the candidate PoI service provider may accept the unregister request message and indicate the acceptance status to the automotive user by using error code as "NO_ERROR". Thereafter, the candidate PoI service provider would stop sending notifications to the automotive user. When the unregister request is invalid, for example, if the request number is improperly formatted, then the unregister request will be rejected by indicating the error code "INVALID_REQUEST". Similarly, when the unregister request is unexpected, for instance, if the automotive user has not registered for receiving notifications from the candidate PoI service provider, but is sending the unregister request, then the unregister request will be rejected by indicating error code as "UNEXPECTED_REQUEST".

In some embodiments, the candidate PoI service provider may send notification messages to the automotive user using the message format as shown in FIG. 2H(13). In this message format,
Request number is the number returned by the candidate PoI service provider in response to NEW_REQUEST request sent by the automotive user to place an order.
Notification text is the update that the candidate PoI service provider wants to send to the automotive user.

At block 247L, the candidate PoI service provider may receive an arrival notification from the automotive user, when the automotive user arrives at the location of the candidate PoI service provider. The automotive user may send the arrival notification using the update_message format itself, by setting the "status" field to "ARRIVED".

In some embodiments, when the automotive user reaches the location of the candidate PoI service provider, the candidate PoI service provider may provide the JIT service to the automotive user, as per the order placed by the automotive user during his commute towards the location of the candidate PoI service provider. In other words, the candidate PoI service provider may fulfil the order of the automotive user just when the automotive user arrives at the location of the candidate PoI service provider, without any delay. This may be possible due to the real-time status updates provided the automotive user as per the agreed update interval.

In some embodiments, the JIT service enabling module 231 may enable, upon establishing the real-time synchronization as discussed above, the candidate PoI service provider to dynamically determine arrival events including an estimated time of arrival and non-arrival events of the automotive user, to provide JIT service to the automotive user. In some embodiments, the JIT service may include, but not limited to, dynamically managing reservations at the candidate PoI service provider, dynamically managing preparation of order placed by the automotive user, and dynamically managing cancellations of order placed by the automotive user, by monitoring the arrival and the non-arrival events of the automotive user. As an example, the arrival events may include estimated time of arrival, speed at which the vehicle 101 is moving, current location of the vehicle 101, traffic on route while the vehicle 101 is commuting towards the candidate PoI service provider. As an example, the non-arrival events may include re-routing towards a different direction, emergency, Traffic blockage and the like.

In some embodiments, after the candidate PoI service provider provides the JIT service to the automotive user, the candidate PoI service provider may close the order request and may send a REQUEST_FULFILMENT_CONFIRMATION request message to the automotive user. The message format of the REQUEST_FULFILMENT_CONFIRMATION request message is as shown in FIG. 2H(14).

In this message format, the Request number is the number returned by the candidate PoI service provider in response to NEW_REQUEST request message sent by the automotive user to place an order. The REQUEST_FULFILMENT_CONFIRMATION request message may be displayed on the HMI of the in-vehicle device 103 to receive confirmation of the automotive user. The automotive user may provide confirmation via a REQUEST_FULFILMENT_CONFIRMATION response message, to the candidate PoI service provider.

In some embodiments, when the candidate PoI service provider failed to provide JIT service to the automotive user due to one of the reasons as indicated in the table shown in FIG. 2H(15), the candidate PoI service provider may send a REQUEST_FULFILMENT_CONFIRMATION message indicating a suitable error code and the reason, to the automotive user. The automotive user may then provide confirmation via a REQUEST_FULFILMENT_CONFIRMATION response message, to the candidate PoI service provider.

In some embodiments, the feedback receiving module 233 may receive a feedback related to service provided by the candidate PoI service provider, to the automotive user, from the automotive user. In some embodiments, the automotive user may provide the feedback to feedback receiving module 233 using a RECORD_CUSTOMER_SATISFACTION_FEEDBACK request message. The message format of the RECORD_CUSTOMER_SATISFACTION_FEEDBACK request message may be as shown in FIG. 2H(16).

In this message format,
Token number may refer to a string or number returned by the PoI service aggregator system 105 in response to NEW_TOKEN request.
Max rating may refer to non-zero positive integer which defines upper limit of rating
User rating may refer to feedback provided by the automotive user regarding order fulfilment made by the candidate PoI service provider. The value of user rating would be between zero and the max rating.

In some embodiments, upon receiving the feedback from the automotive user, the feedback receiving module 233 may respond using the RECORD_CUSTOMER_SATISFACTION_FEEDBACK response message. The message format of the RECORD_CUSTOMER_SATISFACTION_FEEDBACK response message is as shown in FIG. 2H(17).

In this message format, error code refers to one of "NO_ERROR", "INVALID FEEDBACK", "INVALID_REQUEST" and "UNEXPECTED_REQUEST". Purpose of each of these error codes is explained in the FIG. 2B(5).

In some embodiments, the PoI service aggregator system 105 may further receive details related to the order request such as items ordered by the automotive user, price of the items and the like, from the candidate PoI service provider. The details thus received from the candidate PoI service provider may be stored in the memory 113, which can be used at a later stage as historical preferences of the automotive user. Further, the cancelling module 235 may dynamically manage cancellations of order placed by the automotive user, by monitoring the arrival and the non-arrival events of the automotive user.

To dynamically manage cancellations, firstly, the cancellation events should occur. In some embodiments, cancellations may occur due to one of the following reasons:
Emergency: In one embodiment, the cancellation may occur due to an emergency such as an accident, health issue while travelling and the like. In some embodiments, when the cancellation event is "Emergency", the automotive user may set an emergency flag in the in-vehicle device 103. In some other embodiments, the in-vehicle device 103 may automatically determine occurrence of an emergency by monitoring keywords used by the automotive user while communicating in the vehicle 101, by tracking dialed numbers, for instance, if the automotive user has dialed to emergency services such as ambulance, fire engine, police station and the like, then the in-vehicle device 103 may automatically set the emergency flag. In some other scenarios, if the vehicle 101 has met with an accident, the sensors in the vehicle 101 may update the status of the vehicle 101 to the in-vehicle device, which in turn sets the emergency flag. Setting of an emergency flag may indicate that, the automotive user or the vehicle 101 may not be in a state to reach the location of the candidate PoI service provider. Therefore, when the emergency flag is set, the in-vehicle device 103 may automatically send a cancellation request to the candidate PoI service provider. In some embodiments, the cancellation request may be sent in the form of REQUEST_CANCELLATION request message, by indicating reason as "emergency". The candidate PoI service provider may then update the PoI service aggregator system 105 regarding the cancellation request.

The message format of the REQUEST_CANCELLATION request message is as shown in FIG. 2H(18). In this message format,
Request number refers to the number returned by the candidate PoI service provider in response to NEW_REQUEST request sent by the automotive user to place an order.
Reason refers to the reason why the cancellation occurred. As an example, the reason may be one of the reasons mentioned in the table shown in the FIG. 2H(19).
Currency refers to currency in which the refund amount is specified. In some embodiments, this field will be applicable when the order has been cancelled by the PoI service provider. In some embodiments, it may be computed by the cancelling module 235 based on certain conditions, which is explained in a further section of this document.
Refund amount refers to the amount to be refunded as a result of cancellation by the PoI service provider.

In this scenario, since the cancellation request is initiated by the automotive user due to an emergency, the exemplary REQUEST_CANCELLATION request message may be as shown in FIG. 2H(20).

In some embodiments, the candidate PoI service provider may send a response in the form of REQUEST_CANCELLATION response message. The message format of the REQUEST_CANCELLATION response message may be as shown in FIG. 2H(21). In this message format, Error code refers to one of "NO_ERROR", "INVALID_REQUEST", and "UNEXPECTED_REQUEST". Purpose of each of the error codes is explained in a table in FIG. 2B(5). As an example, when the automotive user has given all the information for cancelling the order request properly, then the error code may indicate "NO_ERROR" and proceed with cancelling the order request. In case, there is a formatting error in any of the field in the cancellation request message, the error code may be indicated as "INVALID_REQUEST", and in case there is no order request placed, but the automotive user sends a cancellation request message, then the error code may be indicated as "UNEXPECTED_REQUEST". The subsequent REQUEST_CANCELLATION response message may be as shown in the FIG. 2H(22).

Change in plans: In another embodiment, the cancellation the automotive user may change his plan of visiting the candidate PoI service provider and may travel in a different route or may visit a different PoI service provider of his choice. In such scenarios, the automotive user may send a cancellation request to the candidate PoI service provider, via the HMI of the in-vehicle device 103. In some embodiments, the automotive user may send an exemplary REQUEST_CANCELLATION request message to the candidate PoI service provider as shown in the FIG. 2H(23).

The candidate PoI service provider may then update regarding the cancellation request to the PoI service aggregator system 105.

Cancellation by service provider: In another embodiment, the candidate PoI service provider may cancel the order request of the automotive user due to reasons such as unexpected crowd at the PoI, insufficient resources to provide the requested services or to meet the demand of the automotive user, inconvenient timings and the like. In some embodiments, the candidate PoI service provider may send a REQUEST_CANCELLATION request message to the automotive user, which would be displayed on the HMI of the in-vehicle device 103. In some embodiments, the exemplary REQUEST_CANCELLATION request message sent by the candidate PoI service provider in this context may be as shown in the FIG. 2H(24). The candidate PoI service provider may then update regarding the cancellation request to the PoI service aggregator system 105.

In some embodiments, upon initiating the cancellation request by one of the candidate PoI service provider or the automotive user, the cancelling module 235 may dynamically manage cancellations of the order placed by the automotive user. To dynamically manage the cancellations of the order placed by the automotive user, the cancelling module 235 may initially receive the cancellation request from the automotive user or the candidate PoI service provider. Upon receiving the cancellation request, the cancelling module 235 may determine the following parameters based on the arrival and the non-arrival events:

t: time elapsed since the order request placed by the automotive user was accepted by the candidate PoI service provider;

$T_{max}$: Maximum time limit for initiating the cancellation request, which is x % of time left to reach the location of the candidate PoI service provider, as determined from the initial status update received from the in-vehicle device 103. In this, x % may be pre-configured in the PoI service aggregator system 105, and may be decided by the JIT service providing network.

Upon determining the aforementioned parameters, the cancelling module 235 may check whether the cancellation request is initiated by the automotive user or the candidate PoI service provider, and the reason for cancelling the request. Thereafter, the cancelling module 235 may check whether the cancellation request was initiated before the expiry of the maximum time limit for initiating the cancellation request or after.

When the cancellation request is initiated
by the automotive user; and
before the expiry of the maximum time limit for initiating the cancellation request ($t<=T_{max}$),
the cancelling module 235 may refund complete amount of the order request, without penalty, to the automotive user.

When the cancellation requested is initiated due to emergency, the cancelling module 235 may refund complete amount of the order request, without penalty, to the automotive user. When the reason for cancellation is "Emergency", the cancelling module 235 may refund the amount irrespective of the time at which the cancellation request was initiated.

When the cancellation request is initiated
by the automotive user; and
after the expiry of the maximum time limit for initiating the cancellation request ($t>T_{max}$),
the cancelling module 235 may charge penalty (P) based on proximity factor when the cancellation request is initiated by the automotive user. In some embodiments, the proximity factor is determined based on current distance ($d_{current}$) of the automotive user from the location of the candidate PoI service provider (as per the latest status update), and initial distance ($d_{start}$) of the automotive user from the location of the candidate PoI service provider (as per the first status update). The proximity factor (F) may be determined using the below Equation 1.

$$F=1-(d_{current}/d_{start}) \quad \text{Equation 1}$$

In some embodiments, the cancelling module 235 may determine the penalty as a function of the proximity factor (F) and maximum penalty threshold value ($P_{max}$), when the proximity factor (F) is above a predefined minimum proximity threshold. As an example, the predefined minimum proximity threshold may be "0".

In other words, when the proximity factor is greater than "0" but less than or equal to "1" i.e. (0<f<=1), penalty (P) for the automotive user may be determined using the below Equation 2.

$$P=F*P_{max} \quad \text{Equation 2}$$

In the above Equation 2,
$P_{max}$ refers to maximum penalty threshold value that can be charged for the automotive user. In some embodiments, the $P_{max}$ is defined as y % of the total value of order request.

In some embodiments, higher value of "F" indicates that the automotive user was closer to the candidate PoI service provider when the cancellation request was initiated. Hence, the cancelling module 235 may infer that, the automotive user made a late decision for cancelling the order request. Therefore, higher the value of "F", higher the penalty "P".

In some embodiments, the cancelling module 235 may determine the penalty as the maximum penalty threshold value ($P_{max}$), when the proximity factor (F) is below a predefined minimum proximity threshold.

In other words, when the proximity factor is less than or equal to "0" i.e. (f<=0), penalty (P) for the automotive user may be determined as $P_{max}$. In some embodiments, zero or negative value of "F" indicates that the automotive user did not even start from the initial location of the vehicle 101 when the order request was placed or the automotive user was probably moving away from the destination i.e., moving away from the location of the candidate PoI service provider. Hence the cancelling module 235 may infer that the automotive user may not have any real intention to reach the location of the candidate PoI service provider. Hence, the cancelling module 235 may impose maximum penalty for the automotive user in this scenario.

Further, when the cancellation request is initiated by the candidate PoI service provider, the cancelling module 235 may record a feedback provided by the automotive user, for the candidate PoI service provider. In some embodiments, the feedback may be one of a positive feedback or a negative feedback. In some other embodiments, the feedback may be text inserted by the automotive user. In yet other embodiments, the feedback may be in the form of star rating. In some embodiments, each star may be associated with a rating score at the backend. In yet other embodiments, the feedback may be in the form of emojis. In some embodiments, each emoji may be associated with a rating score at the backend. For instance, emojis which indicate the emotions such as "sad", "angry", "frustration", "crying" and the like may represent a negative feedback, and the emojis which indicate the emotions such as "Happy", "very happy", "laughing", "peace" and the like may represent a positive feedback. In yet other embodiments, the feedback may be provided in the form of a rating score ranging from 0 to 10. In these scenarios, where the candidate PoI service provider cancels the order request, the candidate PoI service provider may not be explicitly charged.

Henceforth, the process of providing Just-In-Time (JIT) service to automotive users is explained with the help of one or more examples for better understanding of the present disclosure. However, the one or more examples should not be considered as limitation of the present disclosure.

Scenario 1: Consider an automotive user is travelling along Route 1. While travelling, the automotive user recalls a PoI service provider "ABC" along Route 1, which his friend had suggested to visit. Consider, the preferred PoI service provider is not a part of the pre-registered JIT service providing network. The automotive user sends a service request to the PoI service aggregator system 105 stating information of the preferred PoI service provider, for on-boarding the preferred PoI service provider to the JIT service providing network. The service request sent by the automotive user to the PoI service aggregator system 105 is as shown in FIG. 2I(1).

The PoI service aggregator system 105 checks the request to see if the contact details are given in a proper format. In this scenario, since the contact details of the preferred PoI service provider are provided in a proper format, the PoI service aggregator system 105 responds to the service request as shown in FIG. 2I(2).

The PoI service aggregator system 105 may then send an on-board request to the preferred PoI service provider, using the contact details (email ID) provided by the automotive user. Consider the preferred PoI service provider is willing to on-board. The preferred PoI service provider then sends the on-board request to join the JIT service providing network. The PoI service aggregator system 105 checks the on-board request to validate if all the details required for registration are present and given in a proper format, and accordingly on-boards the preferred PoI service provider into the JIT service providing network, by accepting the registration request and adding the preferred PoI service provider to a PoI service provider database.

Scenario 2:

Consider an automotive user travelling along Route 1 wishes to have some snacks, but is unsure of the PoI service providers located along that route. In such scenarios, the automotive user sends a service request to the PoI service aggregator system 105 to dynamically recommend one or more PoI service providers 107.

In order to send the service request, the automotive user should first generate a token number to be included in every transaction with the PoI service aggregator system 105. The automotive user may request for a new token, by stating the vehicle ID as shown in FIG. 2I(3).

The PoI service aggregator system 105 checks the request to see if the vehicle ID is provided in a proper format. In this scenario, since the vehicle ID is provided in proper format, the PoI service aggregator system 105 responds to the token number as shown in FIG. 2I(4). Then the automotive user sends the service request as shown in FIG. 2I(5).

Based on the inputs provided in the service request, the PoI service aggregator system 105 infers that, the automotive user may require a refreshing cold drinks or ice creams, since the local temperature and fatigue levels are high. The PoI service aggregator system 105 also looks at the historic preferences of the automotive user and infers that, the automotive user has previously visited ice cream parlors during similar input conditions. Therefore, the PoI service aggregator system 105 may list out the PoI service providers along route 1, who belong to the PoI categories "Ice cream parlour" and "Café". The PoI service aggregator system 105 may re-order the list of PoI service providers such that the PoI service providers belonging to the PoI category "Ice cream parlour" are listed first, in view of the historic preferences of the automotive user.

The PoI service aggregator system 105 may then provide the first list of one or more recommended PoI service providers 107 to the automotive user, using a POI_REC-OMMEND response message as shown in FIG. 2I(6). The details of PoI 1 to PoI 3 in this scenario are as shown in the FIG. 2I(7).

Upon receiving the first list of one or more recommended PoI service providers, the automotive user may provide feedback using the "RECORD_RELEVANCE_FEED-BACK" request message as shown in FIG. 2I(8).

Scenario 3: Consider the automotive user is travelling along Route 1 and desires to have lunch. The automotive user may send a user query stating "Want to have lunch" via a service request. Based on the user query, the PoI service aggregator system 105 provides a second list of one or more PoI service providers 107.

In order to send the service request, the automotive user requires a token number, which would be generated as explained under scenario 2. Upon generating the token number, the PoI service aggregator system 105 receives the service request from the automotive user, using POI-_QUERY Request message as shown in FIG. 2I(9).

The PoI service aggregator system 105 may validate the POI_QUERY request message received from the automotive user. In the above message, value for input string is some random symbols which does not specify a user query, which is an error. The PoI service aggregator system 105 may respond to the service request with POI_QUERY response message indicating a suitable error code as shown in FIG. 2I(10).

Upon receiving this response message, the automotive user notices that there was an error in the input string and may re-send the request message with proper input string as shown in FIG. 2I(11).

The PoI service aggregator system 105 may validate the POI_QUERY request message received from the automotive user, then identify the PoI category requested by the automotive user, and accordingly list out the PoI service providers belonging to the identified PoI category. In this scenario, PoI category is identified as "Restaurant" and 3 PoI service providers belonging to this category are found along route 1, which are provided as the second list of one or more PoI service providers 107 to the automotive user as shown in FIG. 2I(12).

The details of PoI 1 to PoI 3 in this scenario are as shown in FIG. 2I(13). Upon receiving the second list of one or more PoI service providers 107, the automotive user may provide feedback using the "RECORD_RELEVANCE_FEED-BACK" request message as shown in FIG. 2I(14).

In each of the aforementioned scenarios, the automotive user selects one of the candidate PoI service provider. The PoI service aggregator system 105 establishes a real-time synchronization between the candidate PoI service provider and the automotive user. As an example, consider user selects "PoI 1: AB Ice creams" as the candidate PoI service provider. The real-time synchronization is established between the "PoI 1: AB Ice creams" and the automotive user i.e., the in-vehicle device 103 of the vehicle 101 in which the automotive user is travelling.

The automotive user may send a SERVICE_CATA-LOG_FETCH request message to request for the service catalogue of the PoI 1, as shown in FIG. 2I(15). The PoI 1 responds with a SERVICE_CATALOG_FETCH response message as shown in FIG. 2I(16). The details of Item 1 to Item 5 in this scenario are as shown in the table in FIG. 2I(17). Upon receiving the service catalogue from the PoI 1, the automotive user may place an order request using the NEW_REQUEST request message as shown in FIG. 2I(18).

Upon receiving the order request, the PoI 1 may respond using the NEW_REQUEST response message may be as shown in FIG. 2I(19).

Upon placing the order request, the automotive user may negotiate update interval with the PoI 1, to send the status updates. The update interval may be negotiated using NEGOTIATE_UPDATE_INTERVAL request message as shown in FIG. 2I(20). However, the PoI 1 desires to receive the status update at 5 minutes interval. Hence, the PoI 1 responds to the automotive user using the NEGOTIATE_UPDATE_INTERVAL response message as shown in FIG. 2I(21).

Consider the automotive user is in agreement with the suggested time interval. The automotive user may then send another NEGOTIATE_UPDATE_INTERVAL request message with the suggested time interval of 5 minutes, and then the PoI 1 may respond using NEGOTIATE_UPDATE_INTERVAL response message, with the error code "NO_ERROR" to indicate the acceptance of the update interval.

Upon setting the update interval dynamically, the in-vehicle device 103 of the automotive user's vehicle 101 sends an update message to the PoI 1 at every five minutes interval as shown in FIG. 2I(22)-FIG. 2I(25).

PoI 1 may start preparing according to the order request when the ETA of the automotive user is 10 min. Upon receiving the status update "ARRIVED", the PoI 1 may begin to provide the services to the automotive user, without making the automotive user wait. Upon completing the services, the PoI 1 may send the REQUEST_FULFILMENT_CONFIRMATION request message to the automotive user as shown in FIG. 2I(26).

The automotive user may respond to the PoI 1 by sending the REQUEST_FULFILMENT_CONFIRMATION response message to the PoI 1 as shown in FIG. 2I(27). Thereafter, the automotive user may provide feedback to the PoI service aggregator system 105 by sending a RECORD_CUSTOMER_SATISFACTION_FEEDBACK request message as shown in FIG. 2I(28). The PoI service aggregator system 105 may respond to the feedback request message by sending a RECORD_CUSTOMER_SATISFACTION_FEEDBACK response message to the automotive user as shown in FIG. 2I(29).

Figure 3:
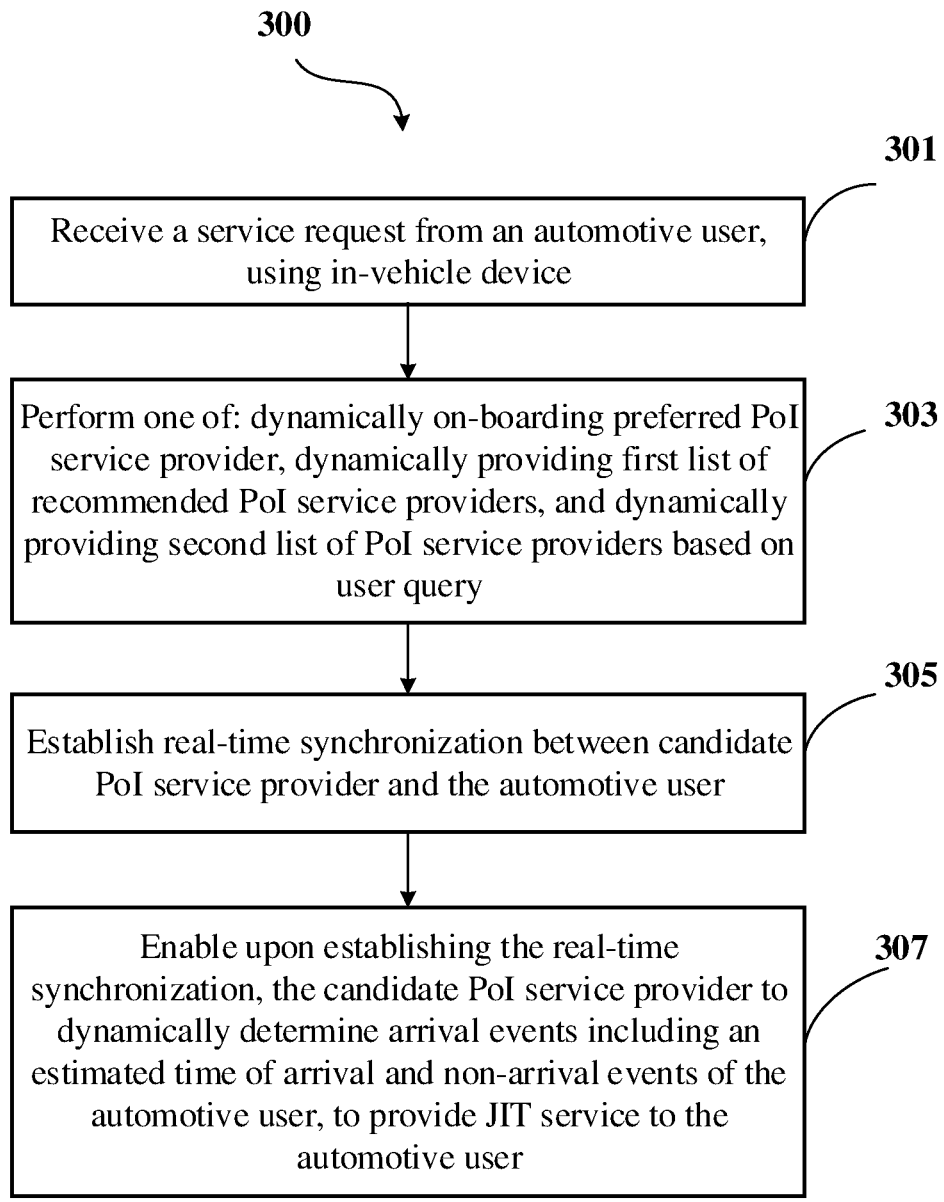
FIG. 3 shows a flowchart illustrating a method of providing Just-In-Time (JIT) service to automotive users in accordance with some embodiments of the present disclosure; and It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

FIG. 3 shows a flowchart illustrating method of providing Just-In-Time (JIT) service to automotive users in accordance with some embodiments of the present disclosure.

As illustrated in FIG. 3, the method 300 comprises one or more blocks illustrating a method of providing Just-In-Time (JIT) service to automotive users. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of a Point of Interest (PoI) service aggregator system 105, a service request from an automotive user. In some embodiments, the service request may include one of, information related to a preferred PoI service provider, a request to recommend one or more PoI service providers 107, or a request to list one or more PoI service providers 107 based on a user query. In some embodiments, the automotive user may transmit the service request to the PoI service aggregator system 105 using one or more in-vehicle devices 103.

At block 303, the method 300 may include performing, by the processor 109, one of: dynamically on-boarding the preferred PoI service provider who is not a part of pre-registered JIT service providing network, dynamically providing a first list of one or more recommended PoI service providers 107 to the automotive user, or dynamically providing a second list of one or more PoI service providers 107 based on the user query, to the automotive user. In some embodiments, when the service request includes information related to a preferred PoI service provider, the processor 109 may dynamically on-board the preferred PoI service provider who is not a part of the pre-registered JIT service providing network. Similarly, when the service request includes the request to recommend one or more PoI service providers 107, the processor 109 may dynamically provide the first list of one or more recommended PoI service providers 107 to the automotive user. Further, when the service request includes the request to list one or more PoI service providers 107 based on the user query, the processor 109 may dynamically provide the second list of one or more PoI service providers 107 based on the user query, to the automotive user.

In some embodiments, dynamically on-boarding the preferred PoI service providers may include, by the processor 109 may include sending an on-board request to the preferred PoI service provider, receiving a registration request in response to the on-board request, validating the registration request to ensure presence of each of one or more parameter values required for registration, on-boarding the preferred PoI service provider into the JIT service providing network, by accepting the registration request and adding the preferred PoI service provider to a PoI service provider database, if the registration request is successfully validated, and sending an on-boarding success status message to the preferred PoI service provider, upon successful on-boarding. In some embodiments, the processor 109 may send an invalid registration request message to the preferred PoI service provider, if the validation of the registration request is unsuccessful.

In some embodiments, dynamically providing the first list of one or more recommended PoI service providers, by the processor 109, may include receiving in-vehicle device data along with the request to recommend the one or more PoI service providers, and detecting prospective PoI categories for the automotive user, based on the in-vehicle device data, user profile of the automotive user, historical preferences of the automotive user and similarity of the automotive user with other automotive users travelling or travelled along same route. Further, the processor 109 may determine the one or more PoI service providers 107 belonging to the detected prospective PoI categories, dynamically, and list the one or more PoI service providers 107 in an order based on a degree of relevancy of the one or more PoI service providers to the automotive user. Thereafter, the processor 109 may provide the listed one or more PoI service providers to the automotive user, as the first list of one or more recommended PoI service providers 107.

In some embodiments, dynamically providing the second list of one or more PoI service providers based on the user query, by the processor 109, may include determining an intent of the automotive user based on the user query, and detecting PoI category for the automotive user based on the determined intent. Thereafter, the processor 109 may determine the one or more PoI service providers 107 belonging to the detected PoI category, dynamically, based on proximity of the one or more PoI service providers to a current location of the automotive user, and provide the listed one or more PoI service providers 107 to the automotive user, as the second list of one or more PoI service providers 107.

In some embodiments, upon dynamically providing one of the first list or the second list, to the automotive user, the processor 109 may receive a feedback related to relevancy of the one or more recommended PoI service providers 107 in the first list, and relevancy of the one or more PoI service providers 107 in the second list, from the automotive user.

At block 305, the method 300 may include establishing, by the processor 109, a real-time synchronization between a candidate PoI service provider and the automotive user. In some embodiments, the candidate PoI service provider may be one of the preferred PoI service provider on-boarded to the JIT service providing network or the PoI service provider selected by the automotive user from the first list or the second list.

At block 307, the method 300 may include enabling, upon establishing the real-time synchronization, by the processor 109, the candidate PoI service provider to dynamically determine arrival events including an estimated time of arrival and non-arrival events of the automotive user, to provide JIT service to the automotive user. In some embodiments, the JIT service may include, but not limited to, dynamically managing reservations at the candidate PoI service provider, dynamically managing preparation of order placed by the automotive user, and dynamically managing cancellations of order placed by the automotive user, by monitoring the arrival and the non-arrival events of the automotive user. In some embodiments, dynamically managing cancellations of order placed by the automotive user may include determining the aspect of penalty imposed on the automotive user, when the cancellation requested is initiated by the automotive user. In some embodiments, such penalty may be determined based on factors such as who initiated the cancellation request, when the cancellation request was initiated, proximity of the vehicle 101 of the automotive user to the location of the candidate PoI service provider when the cancellation request was initiated, maximum penalty, reason for cancellation and the like.

In some embodiments, upon providing the JIT service to the automotive user, the processor 109 may receive feedback for the service provided by the candidate PoI service provider, from the automotive user.

Advantages of the Present Disclosure

The present disclosure provides Just-In-Time (JIT) services such as dynamically managing reservations at the candidate PoI service provider, dynamically managing preparation of order placed by the automotive user, and dynamically managing cancellations of order placed by the automotive user, by monitoring the arrival and the non-arrival events of the automotive user, in real-time.

The real-time synchronization between the service provider and the automotive user helps in monitoring the arrival and non-arrival events in real-time, which in turn helps in enhancing the user experience substantially.

Real-time synchronization provides real-time status updates of the automotive user which in turn enables managing cancellation requests based on the proximity of the automotive user to the location of the service provider. Such status updates help in accurately charging for cancellations, which eliminates the hassles of static cancellation charges, over charging or under charging.

The present disclosure provides a feature wherein inadvertent events such as emergencies are automatically detected in real-time by the in-vehicle device and the automotive user is aided with responsive action based on such detection, which provides improved user experience.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for providing Just-In-Time (JIT) service to automotive users. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of providing Just-In-Time (JIT) service to automotive users, the method comprising:

receiving, by a Point of Interest (PoI) service aggregator system, a token request from an automotive user, wherein the token request comprises information related to the automotive user;

generating, by the PoI service aggregator system, a token number for the automotive user based on the token request;

receiving, by the PoI service aggregator system, a service request from the automotive user using the token number, wherein the service request comprises one of: information related to a preferred PoI service provider, a request to recommend one or more PoI service providers, or a request to list one or more PoI service providers based on a user query;

performing, by the PoI service aggregator system, one of: dynamically on-boarding the preferred PoI service provider who is not a part of pre-registered JIT service providing network, dynamically providing a first list of one or more recommended PoI service providers to the automotive user, or dynamically providing a second list of one or more PoI service providers based on the user query, to the automotive user;

receiving, by the PoI service aggregator system, an order of an item from a candidate PoI service provider, wherein the candidate PoI service provider is one of the preferred PoI service provider on-boarded to the JIT service providing network or a PoI service provider selected by the automotive user from the first list or the second list;

establishing, by the PoI service aggregator system, a real-time synchronization between the candidate PoI service provider and the automotive user;

enabling, upon establishing the real-time synchronization, by the PoI service aggregator system, the candidate PoI service provider to dynamically determine arrival events including an estimated time of arrival and non-arrival events of the automotive user; and dynamically managing, by the PoI service aggregator system, preparation or cancellation of the order placed by the automotive user, to provide JIT service to the automotive user.

2. The method as claimed in claim 1, wherein the automotive user transmits the service request using an in-vehicle device.

3. The method as claimed in claim 1, wherein dynamically on-boarding the preferred PoI service provider comprises:
sending, by the PoI service aggregator system, an on-board request to the preferred PoI service provider;
receiving, by the PoI service aggregator system, a registration request in response to the on-board request;
validating, by the PoI service aggregator system, the registration request to ensure presence of each of one or more parameter values required for registration;
on-boarding, by the PoI service aggregator system, the preferred PoI service provider into the JIT service providing network, by accepting the registration request and adding the preferred PoI service provider to a PoI service provider database, if the registration request is successfully validated; and
sending, by the PoI service aggregator system an on-boarding success status message to the preferred PoI service provider, upon successful on-boarding.

4. The method as claimed in claim 3 further comprises sending, by the PoI service aggregator system, an invalid registration request message to the preferred PoI service provider, if the validation of the registration request is unsuccessful.

5. The method as claimed in claim 1 further comprises recommending, by the PoI service aggregator system, one or more alternative PoI service providers similar to the preferred PoI service provider, to the automotive user, when the preferred PoI service provider is unwilling to on-board the JIT service network, or when the preferred PoI service provider is temporarily or permanently closed, or when the preferred PoI service provider does not exist.

6. The method as claimed in claim 1, wherein dynamically providing the first list of one or more recommended PoI service providers comprises:
receiving, by the PoI service aggregator system, in-vehicle device data along with the request to recommend the one or more PoI service providers, wherein the in-vehicle device data comprises at least one of local temperature, local time, fatigue level of the automotive user and passenger count;
detecting, by the PoI service aggregator system, prospective PoI categories for the automotive user, based on the in-vehicle device data, user profile of the automotive user, historical preferences of the automotive user and similarity of the automotive user with other automotive users travelling or travelled along same route;
determining, by the PoI service aggregator system, the one or more PoI service providers belonging to the detected prospective PoI categories, dynamically;
listing, by the PoI service aggregator system, the one or more PoI service providers in an order based on a degree of relevancy of the one or more PoI service providers to the automotive user; and
providing, by the PoI service aggregator system, the listed one or more PoI service providers to the automotive user, as the first list of one or more recommended PoI service providers.

7. The method as claimed in claim 1, wherein dynamically providing the second list of one or more PoI service providers based on the user query comprises:
determining, by the PoI service aggregator system, an intent of the automotive user based on the user query;
detecting, by the PoI service aggregator system, PoI category for the automotive user based on the determined intent;
determining, by the PoI service aggregator system, the one or more PoI service providers belonging to the detected PoI category, dynamically, based on proximity of the one or more PoI service providers to a current location of the automotive user; and
providing, by the PoI service aggregator system, the listed one or more PoI service providers to the automotive user, as the second list of one or more PoI service providers.

8. The method as claimed in claim 1, wherein establishing the real-time synchronization between the candidate PoI service provider and the automotive user comprises:
receiving, by the PoI service aggregator system, a selection of the candidate PoI service provider, wherein the candidate PoI service provider is one of the preferred PoI service provider or the PoI service provider selected from the first list or the second list;
facilitating, by the PoI service aggregator system, the interface between the candidate PoI service provider and the automotive user, wherein the interface enables the candidate PoI service provider to:
send a service catalog to the automotive user;
receive a list of items ordered by the automotive user, from the service catalog;

send a success message to the automotive user, upon creating an order request based on the list of items ordered by the automotive user;

dynamically set an update interval for receiving a status update from the automotive user;

receive the status update related to the arrival and the non-arrival events from the automotive user, at the dynamically set update interval, wherein the status update comprises a current location of the automotive user, the estimated time of arrival at the candidate PoI service provider, and at least one of traffic update at the location of the automotive user, emergency related updates, order cancellation update, delay related updates and re-routing updates; and receive an arrival notification from the automotive user, when the automotive user arrives at the location of the candidate PoI service provider.

9. The method as claimed in claim 1 further comprises receiving, by the PoI service aggregator system, a feedback from the automotive user, wherein the feedback is related to relevancy of the one or more recommended PoI service providers in the first list, relevancy of the one or more PoI service providers in the second list, and service provided by the candidate PoI service provider.

10. The method as claimed in claim 1, wherein the JIT service comprises at least one of: dynamically managing reservations at the candidate PoI service provider, dynamically managing preparation of order placed by the automotive user, and dynamically managing cancellations of order placed by the automotive user, by monitoring the arrival and the non-arrival events of the automotive user.

11. The method as claimed in claim 10, wherein dynamically managing cancellations of the order placed by the automotive user comprises:

receiving, by the PoI service aggregator system, a cancellation request from the automotive user;

performing, by the PoI service aggregator system, one of:
refunding complete amount of an order request, without penalty, when the cancellation request is initiated by the automotive user before expiry of a maximum time limit for initiating the cancellation request, and when the cancellation request is initiated due to emergency; and charging penalty based on proximity factor when the cancellation request is initiated by the automotive user, upon expiry of the maximum time limit for initiating the cancellation request, wherein the proximity factor is determined based on current distance of the automotive user from a location of the candidate PoI service provider, and initial distance of the automotive user from the location of the candidate PoI service provider.

12. The method as claimed in claim 11, wherein charging penalty based on the proximity factor comprises:

determining, by the PoI service aggregator system, the penalty as a function of the proximity factor and maximum penalty threshold value, when the proximity factor is above a predefined minimum proximity threshold; and determining, by the PoI service aggregator system, the penalty as the maximum penalty threshold value, when the proximity factor is below a predefined minimum proximity threshold.

13. The method as claimed in claim 10, wherein dynamically managing cancellations of the order placed by the automotive user, when a cancellation request is initiated by the candidate PoI service provider comprises recording, by the PoI service aggregator system (105), a feedback provided by the automotive user, for the candidate PoI service provider.

14. A Point of Interest (PoI) service aggregator system for providing Just-In-Time (JIT) service to automotive users, the PoI service aggregator system comprising:

a processor; and a memory communicatively coupled to the processor, wherein the memory stores the processor instructions, which, on execution, causes the processor to:

receive a token request from an automotive user, wherein the token request comprises information related to the automotive user;

generate a token number for the automotive user based on the token request;

receive a service request from the automotive user using the token number, wherein the service request comprises one of: information related to a preferred PoI service provider, a request to recommend one or more PoI service providers, or a request to list one or more PoI service providers based on a user query;

perform one of: dynamically on-boarding the preferred PoI service provider who is not a part of pre-registered JIT service providing network, dynamically providing a first list of one or more recommended PoI service providers to the automotive user, or dynamically providing a second list of one or more PoI service providers based on the user query, to the automotive user;

receive an order of an item from a candidate PoI service provider, wherein the candidate PoI service provider is one of the preferred PoI service provider on-boarded to the JIT service providing network or a PoI service provider selected by the automotive user from the first list or the second list;

establish a real-time synchronization between the candidate PoI service provider and the automotive user;

enable, upon establishing the real-time synchronization, the candidate PoI service provider to dynamically determine arrival events including an estimated time of arrival and non-arrival events of the automotive user; and dynamically managing, by the PoI service aggregator system, preparation or cancellation of the order placed by the automotive user, to provide JIT service to the automotive user.

15. The PoI service aggregator system as claimed in claim 14, wherein to dynamically on-board the preferred PoI service provider, the processor is configured to:

send an on-board request to the preferred PoI service provider;

receive a registration request in response to the on-board request;

validate the registration request to ensure presence of each of one or more parameter values required for registration;

on-board the preferred PoI service provider into the JIT service providing network, by accepting the registration request and adding the preferred PoI service provider to a PoI service provider database, if the registration request is successfully validated; and send an on-boarding success status message to the preferred PoI service provider, upon successful on-boarding.

16. The PoI service aggregator system as claimed in claim 14, wherein to dynamically provide the first list of one or more recommended PoI service providers, the processor is configured to:

receive in-vehicle device data along with the request to recommend the one or more PoI service providers, wherein the in-vehicle device data comprises at least one of local temperature, local time, fatigue level of the automotive user and passenger count;

detect prospective PoI categories for the automotive user, based on the in-vehicle device data, user profile of the automotive user, historical preferences of the automotive user and similarity of the automotive user with other automotive users travelling or travelled along same route;

determine the one or more PoI service providers belonging to the detected prospective PoI categories, dynamically;

list the one or more PoI service providers in an order based on a degree of relevancy of the one or more PoI service providers to the automotive user; and provide the listed one or more PoI service providers to the automotive user, as the first list of one or more recommended PoI service providers.

17. The PoI service aggregator system as claimed in claim 14, wherein to dynamically provide the second list of one or more PoI service providers based on the user query, the processor is configured to:

determine an intent of the automotive user based on the user query;

detect PoI category for the automotive user based on the determined intent;

determine the one or more PoI service providers belonging to the detected PoI category, dynamically, based on proximity of the one or more PoI service providers to a current location of the automotive user; and provide the listed one or more PoI service providers to the automotive user, as the second list of one or more PoI service providers.

18. The PoI service aggregator system as claimed in claim 14, wherein to establish the real-time synchronization between the candidate PoI service provider and the automotive user, the processor is configured to:

receive a selection of the candidate PoI service provider, wherein the candidate PoI service provider is one of the preferred PoI service provider or the PoI service provider selected from the first list or the second list;

facilitate the interface between the candidate PoI service provider and the automotive user, wherein the interface enables the candidate PoI service provider to:

send a service catalog to the automotive user;

receive a list of items ordered by the automotive user, from the service catalog;

send a success message to the automotive user, upon creating an order request based on the list of items ordered by the automotive user;

dynamically set an update interval for receiving a status update from the automotive user;

receive the status update related to the arrival and the non-arrival events from the automotive user, at the dynamically set update interval, wherein the status update comprises a current location of the automotive user, the estimated time of arrival at the candidate PoI service provider, and at least one of traffic update at the location of the automotive user, emergency related updates, order cancellation update, delay related updates and re-routing updates; and receive an arrival notification from the automotive user, when the automotive user arrives at the location of the candidate PoI service provider.

19. The PoI service aggregator system as claimed in claim 14, wherein the JIT service comprises at least one of: dynamically managing reservations at the candidate PoI service provider, dynamically managing preparation of order placed by the automotive user, and dynamically managing cancellations of order placed by the automotive user, by monitoring the arrival and the non-arrival events of the automotive user, wherein to dynamically manage cancellations of the order placed by the automotive user, the processor is configured to:

receive a cancellation request from the automotive user; perform one of:

refunding complete amount of an order request, without penalty, when the cancellation request is initiated by the automotive user before expiry of a maximum time limit for initiating the cancellation request, and when the cancellation request is initiated due to emergency; and charging penalty based on proximity factor when the cancellation request is initiated by the automotive user, upon expiry of the maximum time limit for initiating the cancellation request, wherein the proximity factor is determined based on current distance of the automotive user from a location of the candidate PoI service provider, and initial distance of the automotive user from the location of the candidate PoI service provider.

20. A non-transitory computer readable medium storing instructions for providing Just-In-Time (JIT) service to automotive users, wherein upon execution of the instructions by one or more processors, the processors perform operations comprising:

receiving a token request from an automotive user, wherein the token request comprises information related to the automotive user;

generating a token number for the automotive user based on the token request;

receiving a service request from the automotive user using the token number, wherein the service request comprises one of: information related to a preferred PoI service provider, a request to recommend one or more PoI service providers, or a request to list one or more PoI service providers based on a user query;

performing one of: dynamically on-boarding the preferred PoI service provider who is not a part of pre-registered JIT service providing network, dynamically providing a first list of one or more recommended PoI service providers to the automotive user, or dynamically providing a second list of one or more PoI service providers based on the user query, to the automotive user;

receiving an order of an item from a candidate PoI service provider, wherein the candidate PoI service provider is one of the preferred PoI service provider on-boarded to the JIT service providing network or a PoI service provider selected by the automotive user from the first list or the second list;

establishing a real-time synchronization between a candidate PoI service provider and the automotive user;

enabling upon establishing the real-time synchronization, by the PoI service aggregator system, the candidate PoI service provider to dynamically determine arrival events including an estimated time of arrival and non-arrival events of the automotive user; and dynamically managing preparation or cancellation of the order placed by the automotive user, to provide JIT service to the automotive user.

* * * * *